(12) United States Patent
Sebastian et al.

(10) Patent No.: US 11,080,380 B2
(45) Date of Patent: Aug. 3, 2021

(54) DECENTRALIZED BIOMETRIC IDENTITY AUTHENTICATION

(71) Applicant: AWARE, INC., Bedford, MA (US)

(72) Inventors: Dalys Sebastian, Acton, MA (US); David Benini, Manchester, MA (US)

(73) Assignee: AWARE, INC., Bedford, MA (US)

( * ) Notice: Subject to any disclaimer, the term of this patent is extended or adjusted under 35 U.S.C. 154(b) by 173 days.

(21) Appl. No.: 16/341,304

(22) PCT Filed: Sep. 13, 2017

(86) PCT No.: PCT/US2017/051303
§ 371 (c)(1),
(2) Date: Apr. 11, 2019

(87) PCT Pub. No.: WO2018/089098
PCT Pub. Date: May 17, 2018

(65) Prior Publication Data
US 2020/0145219 A1  May 7, 2020

Related U.S. Application Data

(60) Provisional application No. 62/418,937, filed on Nov. 8, 2016, provisional application No. 62/525,436, filed on Jun. 27, 2017.

(51) Int. Cl.
*G06F 21/32* (2013.01)
*H04L 9/30* (2006.01)
(Continued)

(52) U.S. Cl.
CPC ............ *G06F 21/32* (2013.01); *H04L 9/3073* (2013.01); *H04L 9/3231* (2013.01);
(Continued)

(58) Field of Classification Search
CPC .. G06F 21/32; H04W 12/0609; H04L 9/3073; H04L 9/3231; H04L 9/3242; H04L 63/0861
See application file for complete search history.

(56) References Cited

U.S. PATENT DOCUMENTS 9,130,929 B2 * 9/2015 Dorfman ............. H04L 63/0823
2003/0140235 A1 * 7/2003 Immega ................. H04L 51/30
713/186
(Continued)

FOREIGN PATENT DOCUMENTS

WO  WO 2016/105728  6/2016

OTHER PUBLICATIONS

International Preliminary Report on Patentability for International Application No. PCT/US2017/051303, dated May 23, 2019.
(Continued)

*Primary Examiner* — Joseph P Hirl
*Assistant Examiner* — Stephen T Gundry
(74) *Attorney, Agent, or Firm* — Jason H. Vick; Sheridan Ross, PC

(57) ABSTRACT

A decentralized biometric identity authentication method utilizes biometrics captured on a mobile device to perform identity authentication against data that was registered as part of an identity proofing process and is thus trusted. The user registers his or her biometric using the user's mobile device and associates it with the user's electronic identity as part of a supervised identity proofing process, thus forming a proofed identity, and registers the proofed identity with a federated identity system. To later access the resources of the federated identity system, the user logs in with his or her biometrics. The methods described herein are useful, for example, in the travel, healthcare, and financial services fields.

20 Claims, 15 Drawing Sheets

(51) Int. Cl.
*H04L 9/32* (2006.01)
*H04L 29/06* (2006.01)
*H04W 12/069* (2021.01)

(52) U.S. Cl.
CPC ........ *H04L 9/3242* (2013.01); *H04L 63/0861* (2013.01); *H04W 12/069* (2021.01)

(56) References Cited

U.S. PATENT DOCUMENTS

| | | | | |
|---|---|---|---|---|
| 2007/0106895 | A1 | 5/2007 | Huang et al. | |
| 2009/0031140 | A1* | 1/2009 | Abdallah | H04L 9/3231 713/186 |
| 2013/0042111 | A1* | 2/2013 | Fiske | H04L 9/3239 713/170 |
| 2013/0179681 | A1* | 7/2013 | Benson | H04L 9/3234 713/155 |
| 2014/0101453 | A1* | 4/2014 | Senthurpandi | G06F 21/32 713/172 |
| 2014/0195815 | A1* | 7/2014 | Taveau | G06F 21/32 713/186 |
| 2014/0289833 | A1* | 9/2014 | Briceno | H04L 63/08 726/7 |
| 2014/0372752 | A1* | 12/2014 | Sallis | H04L 9/14 713/165 |
| 2015/0095999 | A1* | 4/2015 | Toth | H04L 63/061 726/6 |
| 2015/0244690 | A1 | 8/2015 | Mossbarger | |
| 2015/0347734 | A1* | 12/2015 | Beigi | H04L 9/3231 713/155 |
| 2016/0205096 | A1* | 7/2016 | Hoyos | G06Q 20/40145 705/72 |
| 2016/0226868 | A1* | 8/2016 | Harding | H04L 63/10 |
| 2016/0277380 | A1* | 9/2016 | Wagner | G06Q 20/3224 |
| 2017/0085562 | A1* | 3/2017 | Schultz | G06K 9/00093 |
| 2017/0257358 | A1* | 9/2017 | Ebrahimi | H04L 9/3247 |
| 2017/0295180 | A1* | 10/2017 | Day | H04L 9/0836 |
| 2017/0300678 | A1* | 10/2017 | Metke | H04L 9/3231 |
| 2018/0173871 | A1* | 6/2018 | Toth | G06F 21/45 |
| 2018/0248699 | A1* | 8/2018 | Andrade | H04L 9/0897 |
| 2018/0373859 | A1* | 12/2018 | Ganong | G06F 21/32 |
| 2019/0068594 | A1* | 2/2019 | Sarwar | H04L 63/0876 |
| 2020/0036707 | A1* | 1/2020 | Callahan | H04L 9/3231 |
| 2020/0280550 | A1* | 9/2020 | Lindemann | H04L 63/0861 |
| 2020/0358614 | A1* | 11/2020 | Fiske | H04L 9/3228 |

OTHER PUBLICATIONS

FIDO Alliance: "FIDO UAF Specification V1.1 retrieved from the Internet" https://fidoalliance.org/specs/fido-uaf-v1.1-rd-20161005.zip; Oct. 5, 2016; 214 pages.
Invitation to Pay Additional Fees and, where Applicable, Protest Fee for International Application No. PCT/US2017/051303, dated Dec. 22, 2017.
International Search Report for International Application No. PCT/US2017/051303, dated Feb. 9, 2018.
Written Opinion for International Application No. PCT/US2017/051303, dated Feb. 9, 2018.
Office Action for European Patent Application No. 17777449.4, dated Oct. 25, 2019.
Intention to Grant for European Patent Application No. 17777449.4, dated May 29, 2020.

* cited by examiner

DECENTRALIZED BIOMETRIC IDENTITY AUTHENTICATION

RELATED APPLICATION DATA

This application is a national stage application under 35 U.S.C. 371 of PCT Application No. PCT/US2017/051303, filed Sep. 13, 2017, which designated the United States, which PCT application claims the benefit of and, under 35 U.S.C. § 119(e), priority to U.S. Provisional Patent Application No. 62/418,937, filed Nov. 8, 2016, entitled "BIOMETRIC SINGLE TRAVEL TOKEN SCHEME," and U.S. Provisional Patent Application No. 62/525,436, filed Jun. 27, 2017, entitled "DECENTRALIZED BIOMETRIC IDENTITY AUTHENTICATION," each of which are incorporated herein by reference in their entirety.

BACKGROUND

Authentication is a process by which a user demonstrates his or her identity by providing unique information, typically in the form of something the user has (e.g. a mobile phone), something the user knows (e.g. a password), or something the user is (e.g. a biometric sample such as a fingerprint or facial image). Perhaps the most common means of user authentication is through use of passwords. There are generally at least two steps in the authentication process: 1) registration and 2) verification. The registration process effectively enrolls a user in an authentication scheme. As part of registration, a user might be compelled to demonstrate some proof of identity and enroll his or her unique device or knowledge (e.g. password). The verification process represents a challenge to produce the unique information.

Passwords are increasingly seen as an outdated means of authentication, particularly for use on mobile devices. Biometric processes have been demonstrated to improve the security and convenience of identity verification mechanisms as compared to approaches that rely on the use of passwords. Allowing a user to authenticate his or her identity via the user's mobile phone is increasingly desirable due to recent hacks to centralized institutions and similar security breaches.

Fast Identity Online (FIDO) Universal Authentication Framework (UAF) is a technical standard that enables users to manage their own credentials in their mobile devices. FIDO addresses the problem of users being able to authenticate from a device using a personal identification number (PIN) and/or biometrics. The FIDO registration process creates a key pair; the private key is saved on the device while the public key is kept on a server. The FIDO authentication process verifies that a response to a cryptographic challenge sent by the server is signed by the right private key.

Identity proofing is a process by which the identity information presented by a user is validated; i.e. demonstrated to be true and accurate. The process is useful upon registration of a user in an authentication scheme. But while biometric authentication schemes such as those specified by FIDO enables password-less authentication, they do not assure that identity proofing has been performed. For example, in the case of a mobile phone PIN being compromised, a fraudster has the opportunity to add his or her own biometrics to the device and then use them to authenticate. Where the fraudster changing the PIN would have been detected by the victim, they would not necessarily be made aware that the fraudster had enrolled his or her own biometrics and now could effectively impersonate the victim.

A blockchain database is a distributed database that allows transactions to be permanently and immutably recorded in an openly shared ledger. Parties adding entries to the ledger need to be identifiable, but desirably use a pseudonymous "virtual identity" that does not convey personally identifiable information of the user. This pseudonymous identity is like an attested copy of a "digital token" that is created once the user has submitted adequate identity verification to a relying party. The advent of blockchain and its various applications provides an opportunity for such institutions to use reliable biometric-based user consent from mobile phones to meet privacy and security guidelines.

The techniques described in this disclosure address the need to enable biometric authentication in those applications whose security requirements demand that evidence be demonstrable that the authenticating individual 1) has undergone some identity proofing process, and 2) is the same person who has undergone the identity proofing process. In other words, these techniques present a means to digitally and cryptographically bind a satisfactory result of the identity proofing of an individual with the biometrics that they enroll to be used for subsequent authentications. Applications for secure and trusted authentication are found where crime, fraud, and injury can otherwise result, such as financial services, immigration and travel, and healthcare.

Furthermore, the techniques described herein facilitate a mechanism, when combined with external technologies including blockchain, for a user to grant permission in a way that is trusted and verifiable. For example, for transactions that require verification of identity by way of visual inspection of a driver's license or by a human interview, the techniques described herein enable this process to be performed only once. The results of the process are then digitally captured and shared with others in a way that is trusted and verifiable.

The techniques described herein are optionally compatible with the FIDO UAF standard and comparable authentication mechanisms. The disclosure can use the flexibilities and extensions provided by the standard to build in the additional capabilities. The techniques are compatible, for example, with SHA-256/SHA-512 cryptographic hashing, and functionally equivalent hashing methods.

BRIEF DESCRIPTION OF THE DRAWINGS

The exemplary embodiments of the technology will be described in detail, with reference to the following figures wherein.

DETAILED DESCRIPTION

Figure 1A:
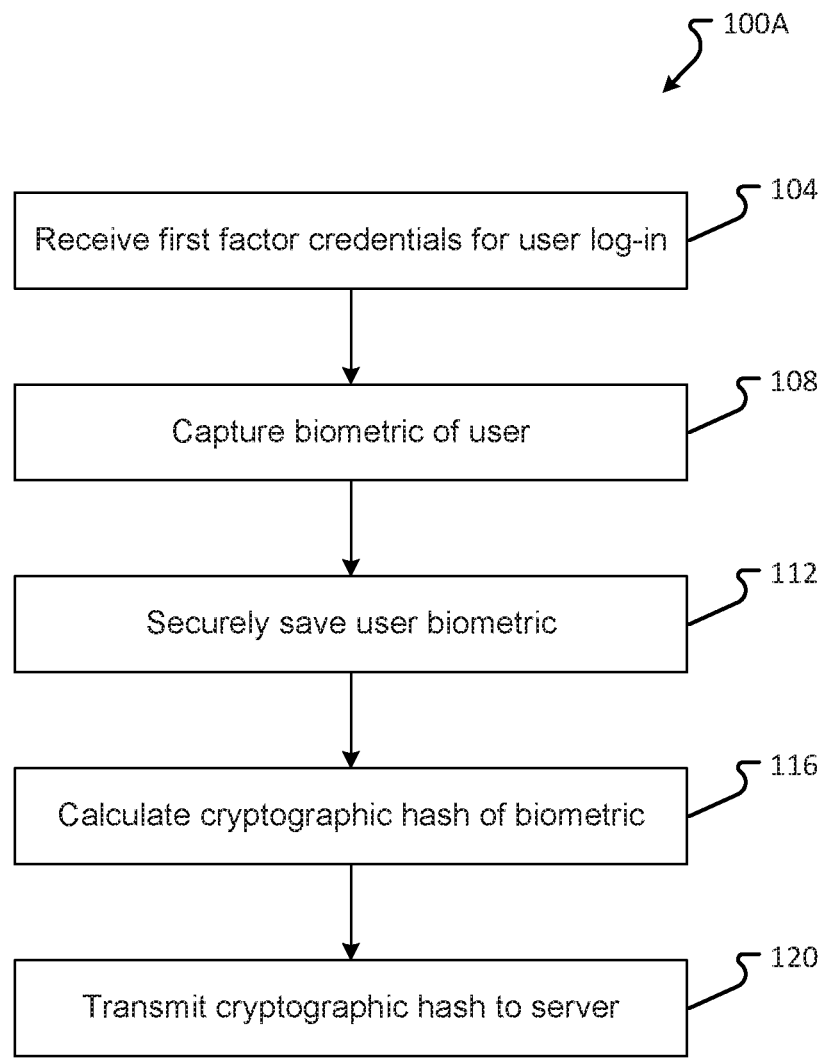
FIG. 1A is a flowchart of a process according to one embodiment of the present disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Terminology

Authentication: assurance of the claimed identity.
Biometric: an intrinsic physical characteristic such as a face, fingerprint, iris, or voice sample used to represent a person's unique personal characteristics as a proxy for their identity.
Biometric process: an automated process using one or more biometric characteristics of a single individual for the purpose of enrollment, verification, or identification.
Identity federation: agreement between two or more domains specifying how identity information will be exchanged and managed for cross-domain identification purposes.
Identity proofing: particular form of authentication based on identity evidence that is performed as the condition for enrollment.
Relying party: recipient of a certificate who acts in reliance on that certificate and/or on a digital signature verified using that certificate.

Aspects of the present disclosure describe methods to reliably identify a customer to a relying party, while also allowing the customer to manage his or her credentials on a mobile device, thus providing secure and effective authentication for all parties.

The combined use of biometrics and hashes as described herein beneficially allows individuals to manage their credentials on a mobile device, and to reliably identify themselves to relying parties. More particularly, a user may enroll his or her biometric image with a mobile device belonging to the user, which may then provide a hash of the biometric image to an identity server of a relying party for future use. The hash may be generated in such a way that the biometric image cannot be recreated or even identified from the hash, and may further be generated in such a way that no two biometrics will produce the same hash. Thus, by providing only a hash of the user's biometric image to the identity server, rather than a copy of the biometric image itself, the user's identity is protected in the event that the identity server is hacked or otherwise compromised.

When the user needs to authenticate herself or himself to the relying party, the user provides her or his biometric to the user's mobile device, which compares the captured biometric image with the enrolled biometric image to verify that they match. In embodiments where the mobile device stores a plurality of enrolled biometric images, the mobile device compares the captured biometric image with the enrolled biometric images to determine whether any of the enrolled biometric images match the capture biometric image. Once a match is confirmed, the mobile device sends to the identity server a hash of the enrolled biometric image that was determined to match the captured biometric image. The identity server compares the received hash with the hash originally received from the user's mobile device. If the hashes are identical, the identity server confirms the user's identity and grants the user access to the relying party and/or the relying party's resources.

Although there are different family of SHA algorithms for hashing, viz., SHA-1, SHA-2 and SHA-3, the SHA-2 family is most well used at present. One of the key properties of a hash is its collision resistance, i.e., no two distinct inputs can result in the same hash. SHA-1 has been proved to result in collisions, and its use is no longer recommended. The SHA-2 family consists of 6 different hash functions, viz., SHA-224, SHA-256, SHA-384, SHA-512, SHA-512/224 and SHA-512/256; the naming of which is determined by the number of bits in the hash value. For e.g., SHA-256 hash indicates that it has a 256-bit hash value.

SHA-224 is a truncated version of SHA-256 hash, while SHA-384 is a truncated version of a SHA-512 hash. SHA-512/224 or SHA-512/256 means there are 512 bits in the computed hash value, but it gets truncated to 224 bits and 256 bits respectively. SHA-256 is based on 32-bit word computations, while SHA-512 is based on 64-bit word computations. Therefore SHA-512/256 may give performance advantage over SHA-256 on 64-bit operating systems, although offering the same level of collision resistance.

According to some embodiment so of the present disclosure, any of the SHA-2 family of hash algorithms with a hash length of 256 bit or higher are used to compute cryptographic hashes. However, the particular hash algorithm used for a given implementations may be selected based on applicable performance needs and memory requirements for the implementation in question.

The foregoing concepts will be described in greater detail by way of example and illustration, using two non-limiting use cases: 1) travel and 2) finance. Each allows the user to be in control of his or her own physical identity such as through the use of biometrics, but at the same time, reliably identifies him or her to a relying party and conducts transactions within a blockchain. An example is the case where a relying party such as a bank or government institution issues a claim on behalf of the virtual identity of a customer. For the relying party to issue the claim, the relying party must be able to reliably identify the customer and prevent identity fraud from being used to abuse the system.

As noted above, the techniques described in this disclosure are optionally compatible with the FIDO UAF standard. In a typical biometric setup on a mobile device using the FIDO standard, the biometric image enrollment happens before the user even visits an app (application), and it is normally done with a vendor-provided user interface. Typically, the mobile user is free to modify the biometric any time after that initial enrollment, and the enrolled biometric does not necessarily lie within the secure boundaries of the relying party's app. But, FIDO leaves the biometric enrollment process largely to the vendor, allowing room for customization.

Biometric verification is done before a FIDO Registration/Authentication. But, no information about the base biometric with which the match occurred is sent to the relying party. Therefore, FIDO authentication only proves whether the authentication originated from a previously-registered device for that user; it does not offer sufficient reliable information to the relying party that the user is who he claims to be. As a result, while the techniques described in the present disclosure are compatible with the FIDO UAF standard, the present disclosure uses the flexibilities and extensions provided by the standard to build in additional needed capabilities.

In a federated identity system, a user needs to bind his or her identity with biometrics only once. Binding an identity with biometrics refers to the process of associating a biometric with the user's electronic identity, so that when the same biometric is captured and analyzed at a later date, the captured biometric can be compared to the bound biometric to determine whether a user presenting a given electronic identity is in fact the user corresponding to the electronic identity. Thus, once a user has bound his or her identity with biometrics, the user wishing to access the resources of the federated identity system need only login to the system with his or her biometrics.

In accordance with some embodiments of the present disclosure, the workflows discussed herein utilize biometric verification on a device as the authentication mechanism to login to a relying party server (e.g. to access the resources of a relying party within a federated identity system). The relying party server may be any server owned, controlled, managed, operated, or otherwise associated with the relying party.

A user must enroll his or her biometric to obtain a bound biometric that can be used for future logins using biometric verification. With reference now to FIG. 1A, a method 100A of biometric enrollment may be carried out by a processor executing instructions compiled as an app, or more generally by a device having a processor that executes instructions stored in a memory of the device. Biometric enrollment from a device need be allowed only after the user has logged into the relying party server using first factor credentials (e.g. a username and password). The user may provide the first factor credentials via a user interface of the device from which the biometric enrollment will occur, and may evaluate the first factor credentials to determine that they are valid. Thus, in step 104 of the method 100A, the user's device receives first factor credentials from the user for logging into the relying party server via a user interface. Prior to providing the first factor credentials, the user may, for example, have opened an app corresponding to the relying party on his or her device, and the app may have prompted the user to provide the first factor credentials before allowing the user to access one or more portions of the app, and/or before allowing the user to access information stored within a secure storage area of the device that is accessible to the app, or that is stored remotely (e.g. on servers associated with the relying party).

The method 100A also comprises capturing the biometric of the user (step 108). The device or relying party app may prompt the user to provide a biometric via a biometric sensor on or associated with the device, or the user may make one or more selections within the app to initiate the biometric capture process. In any event, the user provides a biometric through one or more biometric sensors on or associated with the device, which biometric is captured by such biometric sensor(s) and provided to the app. In some embodiments, the biometric may comprise a fingerprint, and the biometric sensor may comprise a fingerprint reader. In other embodiments, the biometric may comprise a face, and the biometric sensor may comprise a camera. In still other embodiments, the biometric may comprise a retinal pattern or iris pattern, and the biometric sensor may comprise a retinal scanner or iris scanner, respectively. In yet other embodiments, the biometric may comprise a voice pattern, and the biometric sensor may comprise a microphone. Persons skilled in the art will recognize that any one or more of these examples and of other biometrics may be used within the scope of the present disclosure.

Once the biometric has been captured, it is securely saved on the device (step 112) in a memory/storage. In some embodiments, the biometric is stored within the secure boundaries of the relying party app, and is not accessible by any other apps on the device. For example, the biometric may be stored securely using a Trusted Execution Environment (TEE), to prevent tampering with the biometric.

In addition to securely saving the biometric, the device (and/or the relying party app) calculates a cryptographic hash of the biometric (step 116). The cryptographic hash may be calculated using any cryptographic hash function known to persons of ordinary skill in the art, although preferably the cryptographic hash function used is one that has not been compromised.

Included in the method 100A is the step of transmitting the cryptographic hash of the biometric to the relying party server (step 120). The server associates the cryptographic hash of the biometric with the user account in its database, so that it can be subsequently used for additional verifications during login. In this way, the enrolled biometric is registered with the relying party server.

Once a biometric has been enrolled as set forth in the foregoing description of the method 100A, any further changes by the user to the biometric are prevented from happening without the knowledge of the relying party. The enrolled biometric is therefore a bound biometric and may be used as the basis for biometric comparisons/matching for future logon situations.

Figure 1B:
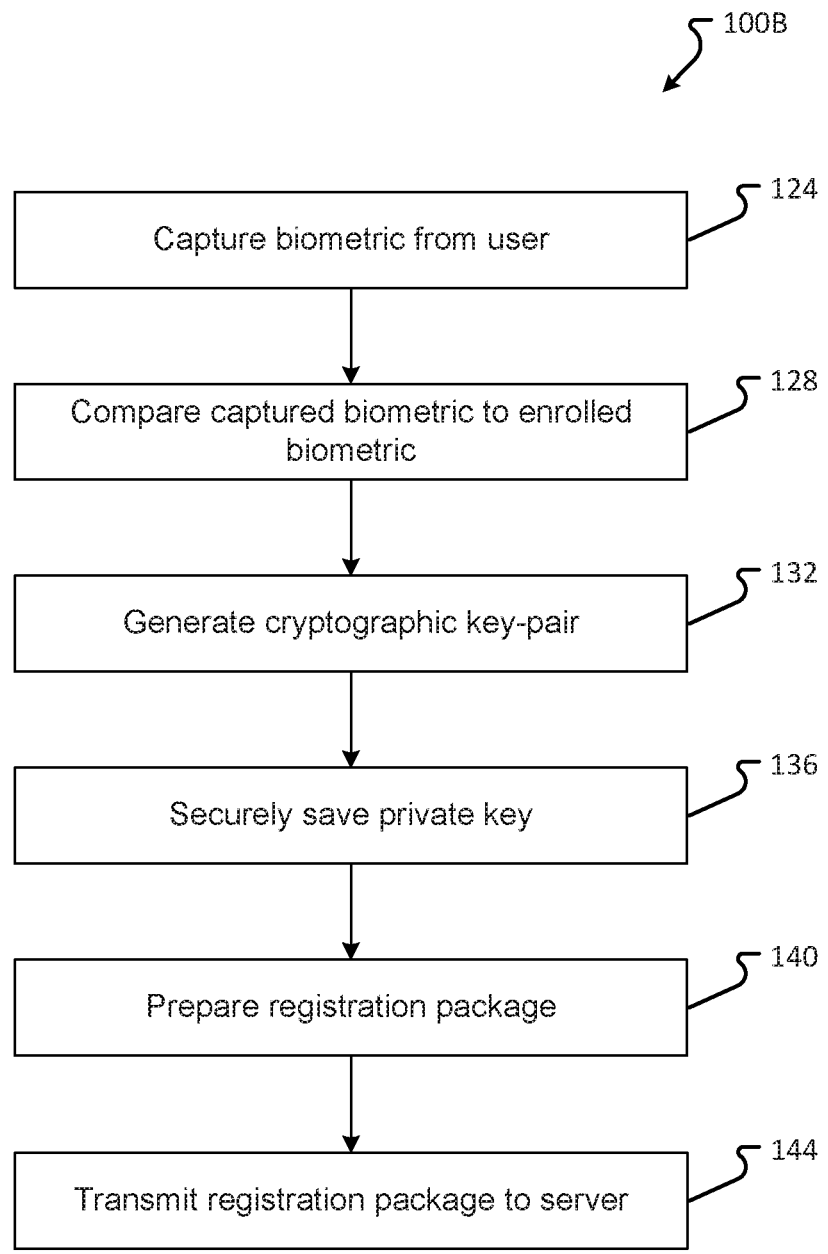
FIG. 1B is a flowchart of a process according to another embodiment of the present disclosure.

Turning now to FIG. 1B, the registration of the user (and more particularly the registration of the user's biometric) with the relying party server comprises a biometric verification. The registration method 100B, which may be carried out by a processor executing instructions compiled as an app, or more generally by a device having a processor that executes instructions stored in a memory of the device, comprises capturing a biometric from a user (step 124). The biometric may be captured using any biometric sensor associated with the app and/or device.

The captured biometric is compared to the enrolled biometric in step 128. The comparison may be made in any manner known in the art. In some embodiments, the comparison may comprise determining a percentage similarity of the captured biometric to the enrolled biometric, and a "match" may be determined if the percentage similarity is greater than a predetermined threshold amount. For example, the comparison may result in a determination that eighty percent of the features of the captured biometric match the features of the enrolled biometric, and the predetermined threshold for identifying a "match" may be seventy-five percent, resulting in a determination that the captured and enrolled biometrics match. Setting a predetermined minimum threshold that is lower than one hundred percent beneficially allows the comparison to remain useful despite changes that may occur to the biometric pattern of the user. For example, if the biometric is the user's fingerprint, and the user scratches his or her finger after enrollment, then the captured biometric would not perfectly match the enrolled biometric. However, if the captured biometric is not required to perfectly match the enrolled biometric, then a match could still be identified.

If the captured biometric is determined to match the enrolled biometric, then a cryptographic key-pair is created for the user (step 132). Any known method of generating cryptographic key pairs may be used to create the cryptographic key-pair for the method 100B.

The private key of the cryptographic key-pair is securely saved within the app and/or device (step 136). The private key may be stored, for example, within the secure boundaries of the relying party app, and may not be accessible by any other apps on the device. The private key may be stored securely, for example, using a Trusted Execution Environment (TEE).

A registration package is then prepared that includes the newly generated public key as well as a cryptographic hash of the enrolled biometric that matches the captured biometric (step 140).

The preparation of the registration package includes the relying party app and/or device signing the package with the private key. In step 144, the signed registration package is transmitted to the relying party server. The transmission may occur, for example, over a communication network such as the Internet, using any appropriate and available transmission protocol, such as the protocol(s) associated with near field communication (NFC), radio frequency identification (RFID) (e.g., operating at 125 kHz, 13.56 kHz, etc.), Bluetooth® wireless communication, Bluetooth® Low Energy (BLE), cellular communications, WiFi communications, and/or other wireless communications.

Although not illustrated as part of the method 100B, once the relying party server receives the signed registration package, the server verifies the signature on the package using the public key, and also verifies the received cryptographic hash of the biometric by comparing it with the cryptographic hash of the biometric stored during enrollment. In this manner, the server verifies that the registration of the enrolled biometric is performed by the same user who holds the biometric for the user account in question. If the verification is successful, then the public key is persisted with the user account in the relying party server database.

Notably, although the biometric enrollment method and the biometric registration method are presented as two separate methods 100A and 100B, they may in some embodiments be merged together and executed as part of the same registration activity.

Figure 2A:
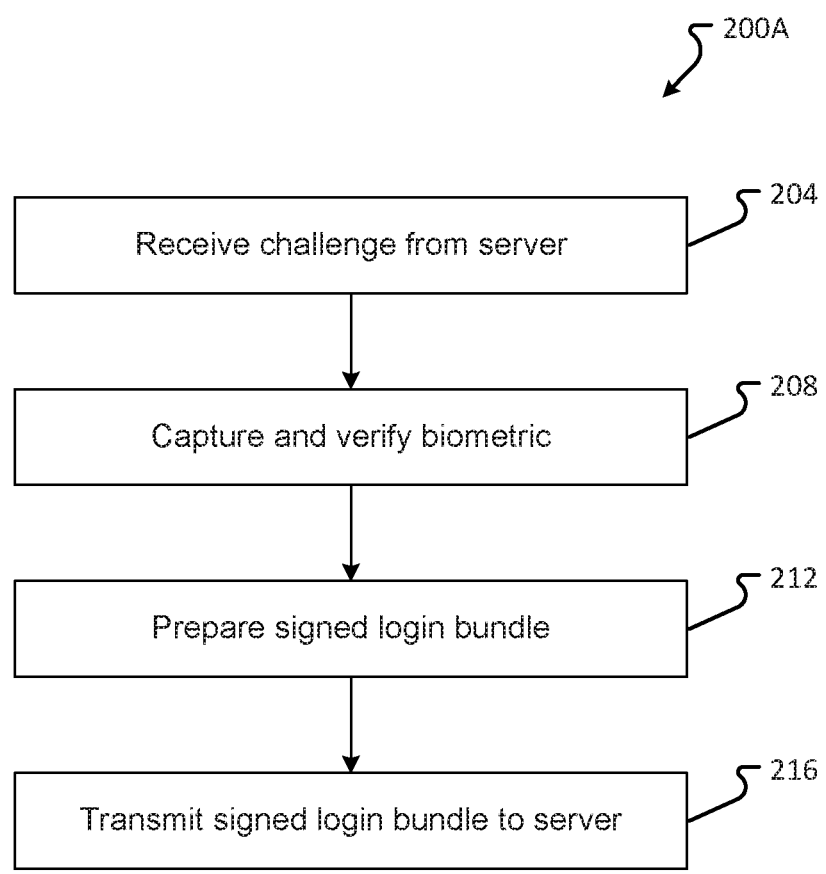
FIG. 2A is a flowchart of a process according to a further embodiment of the present disclosure.

A biometric login process 200A from the relying party app/device side is illustrated in FIG. 2A. During the biometric login process 200A, a user attempting to login to access the resources of the relying party receives, at the device of the user (and, in some embodiments, through a relying party app being executed on the user's device) a challenge from the relying party server (step 204). The challenge asks the user for biometric verification of his or her identity.

In response to the challenge, relying party app and/or the user's device captures and verifies a biometric from the user (step 208). The biometric may be captured using any biometric sensor associated with the app and/or device. The verification comprises a comparison with the enrolled biometric. As in the method 100B, the comparison may be made in any manner known in the art. As also described above with respect to the method 100B, in some embodiments, the comparison may comprise determining a percentage similarity of the captured biometric to the enrolled biometric, and a "match" may be determined if the percentage similarity is greater than a predetermined threshold amount. For example, the comparison may result in a determination that the eighty percent of the features of the captured biometric match the features of the enrolled biometric, and the predetermined threshold for identifying a "match" may be seventy-five percent, resulting in a determination that the captured and enrolled biometrics match. Setting a predetermined minimum threshold that is lower than one hundred percent beneficially allows the comparison to remaining useful despite changes that may occur to the biometric pattern of the user. For example, if the biometric is the user's fingerprint, and the user scratches his or her finger after enrollment, then the captured biometric would not perfectly match the enrolled biometric. However, if the captured biometric is not required to perfectly match the enrolled biometric, then a match could still be identified.

If the captured biometric is successfully verified, the challenge from the relying party server received in step 204 is bundled together with the cryptograph hash of the enrolled biometric that has been determined to match the captured biometric, and this login bundle is then signed using the user's private key (step 212). Once prepared, the signed login bundle is transmitted to the relying party server (step 216), using any suitable communication network and/or protocol.

Figure 2B:
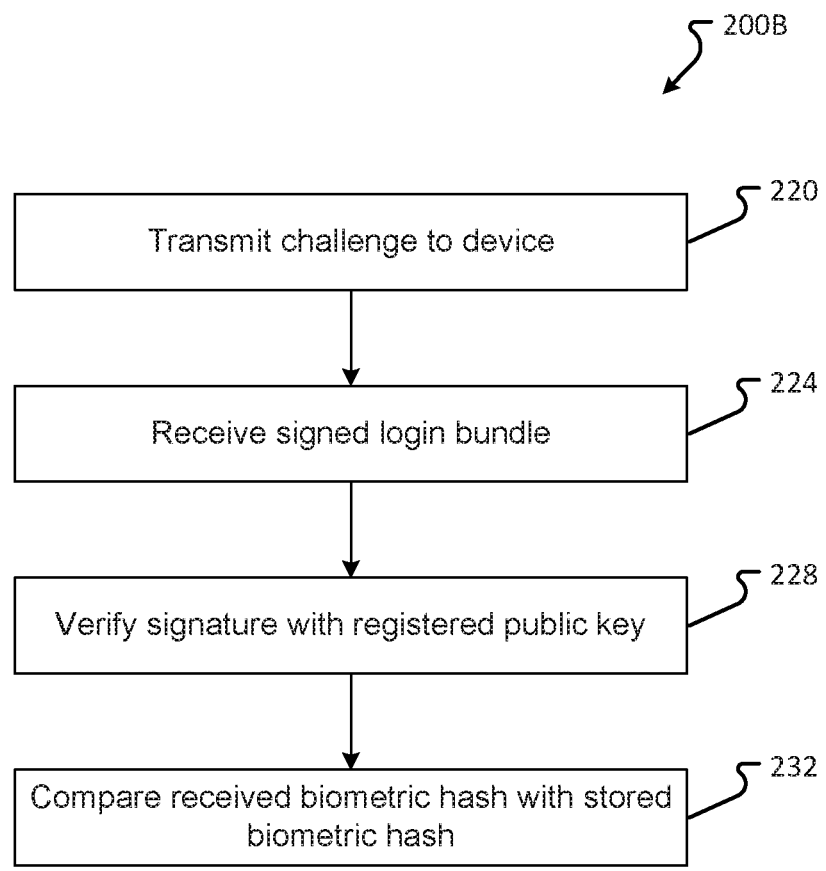
FIG. 2B is a flowchart of a process according to another embodiment of the present disclosure.

FIG. 2B illustrates a biometric login process 200B corresponding to the biometric login process 200A, but from the relying party server side. The relying party server transmits a challenge to the device from the user is attempting to login in step 220. As with other transmissions described herein, the challenge may be transmitted, for example, over a communication network such as the Internet, using any appropriate and available transmission protocol, such as the protocol or protocols associated with near field communication (NFC), radio frequency identification (RFID) (e.g., operating at 125 kHz, 13.56 kHz, etc.), Bluetooth® wireless communication, Bluetooth® Low Energy (BLE), cellular communications, WiFi communications, and/or other wireless communications.

The server receives the signed login bundle in step 224. The signed login bundle may be received via the same communication network and/or protocol used for transmission of the challenge in step 220.

Upon receipt of the signed login bundle, the relying party server verifies the signature of the bundle using the user's public key that was associated with the user's account during registration, as described above in the discussion of the method 100B (step 228).

The relying party server also compares the biometric hash received in the signed login bundle with the biometric hash associated with the user account (e.g. the biometric hash received during enrollment, as described above with respect to the method 100A), and confirms that the biometric hashes match (step 232). The comparison of the received biometric hash with the biometric hash associated with the user account may be accomplished using any method known in the art.

Figure 3:
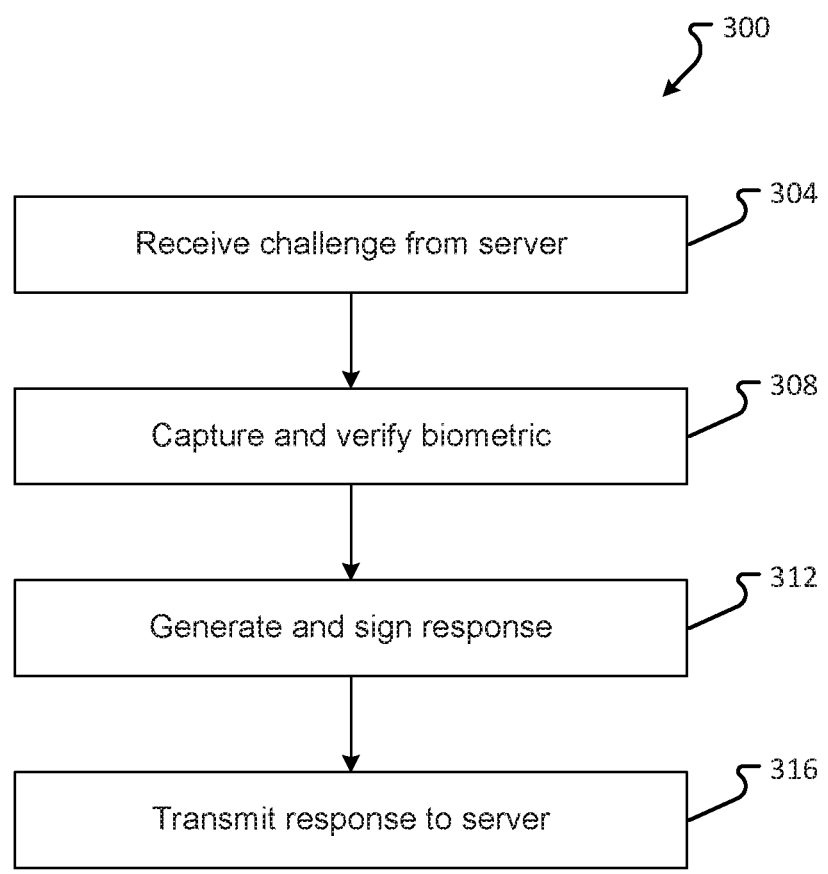
FIG. 3 is a flowchart of a process according to a further embodiment of the present disclosure.

In addition to logging into a user account on or associated with the relying party, as described with respect to FIGS. 2A-2B, a user may also confirm transactions from his or her device using the principles of the present disclosure. With reference now to FIG. 3, a transaction confirmation method 300 begins, as with the method 200A, with receipt of a challenge from the relying party server (step 304). The challenge may be sent by the server automatically upon submission by the user of a transaction request. For example, if the relying party is a bank, the user may initiate a bill pay transaction or a money transfer transaction, and the bank may require a transaction confirmation (using, for example, the method 300) before the transaction is finalized. Thus, upon receipt of the transaction request, the bank's server may send a challenge to the user's device. As another example, a credit card company may require transaction verification anytime a customer uses his or her credit card to make a purchase that exceeds a predetermined dollar amount, so as to limit the credit card company's exposure to fraud. Thus, once the credit card company receives an authorization request for the transaction, the credit card company server may send a challenge to the user's device.

Upon receipt of the challenge, the user's device (and/or a relying party app being executed by the user's device) captures a biometric of the user using a biometric sensor on or associated with the device and/or app, and verifies that the biometric matches the user's enrolled biometric using any method described herein or known in the art (step 308).

If the verification is successful, then the device and/or app creates a response to the relying party server, which is signed using the user's private key, which is securely stored on the mobile device (step 312). The response may include, for example, a cryptographic hash of the biometric corresponding to the successful verification (e.g. an enrolled biometric that has been determined to match a captured biometric), as well as the challenge and a hash of the transaction content. The signed response is transmitted to the server using any transmission method described herein or known in the art (step 316).

Upon receipt of the signed response from the user's device, the relying party server verifies the signature using the user's public key, and compares the biometric hashes and transaction hashes to ensure that the right user is confirming the right transaction.

Figure 4A:
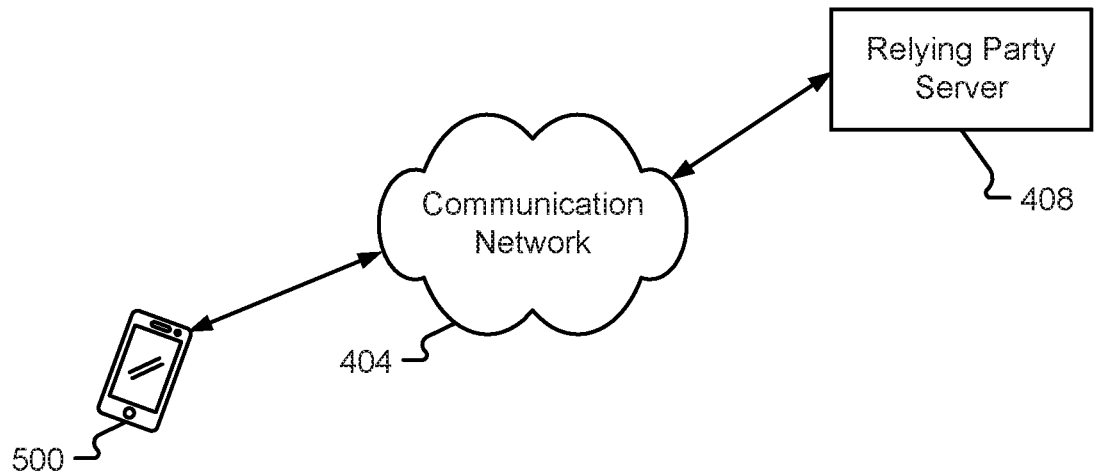
FIG. 4A shows a block diagram of a system according to one embodiment of the present disclosure.
Figure 4B:
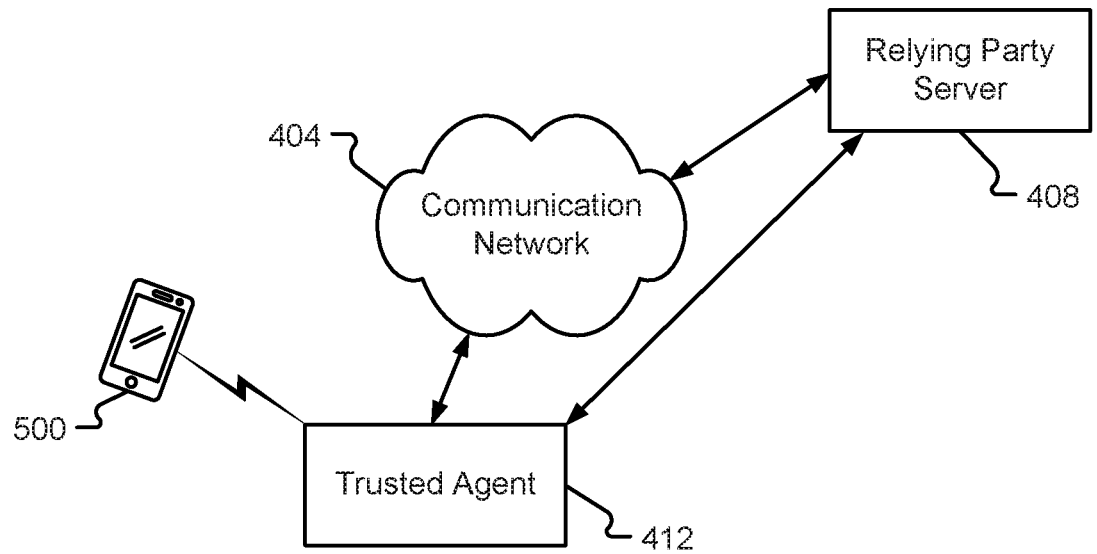
FIG. 4B shows a block diagram of a system according to another embodiment of the present disclosure.

FIGS. 4A and 4B illustrate two possible scenarios for communication between the user's device 500 and a relying party server 408. In FIG. 4A, the user's device 500—which may be, for example, a smart phone, a tablet, a laptop computer, a desktop computer, or any other device comprising a processor, a user interface, a biometric sensor, and a communication interface—communicates with the relying party server 408 via the communication network 404. The communication network 404 may be any wide area network, including but not limited to the Internet. The user device 500 may communicate with the relying party server 408 over the communication network 404 using any suitable wireless protocol. Examples of wireless protocols that may be utilized by the communication interface 112 include IEEE 802.11 protocols such as but not limited to IEEE 802.11a/b/g/n/ac/ax, Bluetooth®, Bluetooth® Low Energy (BLE), FeliCa, Zigbee®, GSM, LTE, 3G, 4G, 5G, RFID, and NFC. Also in some embodiments, the user device 500 may communicate with the relying party server 408 via the communication network 404 using a wired protocol, such as RS-232, RS-422, RS-485, I²C, SPI, IEEE 802.3, IEEE 802.11 and/or TCP/IP.

Turning now to FIG. 4B, when a user needs to perform a biometric-based device login in an environment where Internet connectivity cannot be assumed or assured, a trusted agent 412 may act as an intermediary to make the login possible. The data communication between the relying party app on the user device 500 and the agent 412 may occur, for example, using NFC, and the data may be transmitted in an encrypted form to the trusted agent 412. The agent 412 can then communicate with the relying party server 408 either directly or via the communication network 404 to initiate and complete a biometric login or transaction confirmation process as described above, while ensuring that the relying party app on the user device 500 ultimately performs the biometric login. The low range of NFC ensures that there is minimal interference with other devices.

Figure 5:
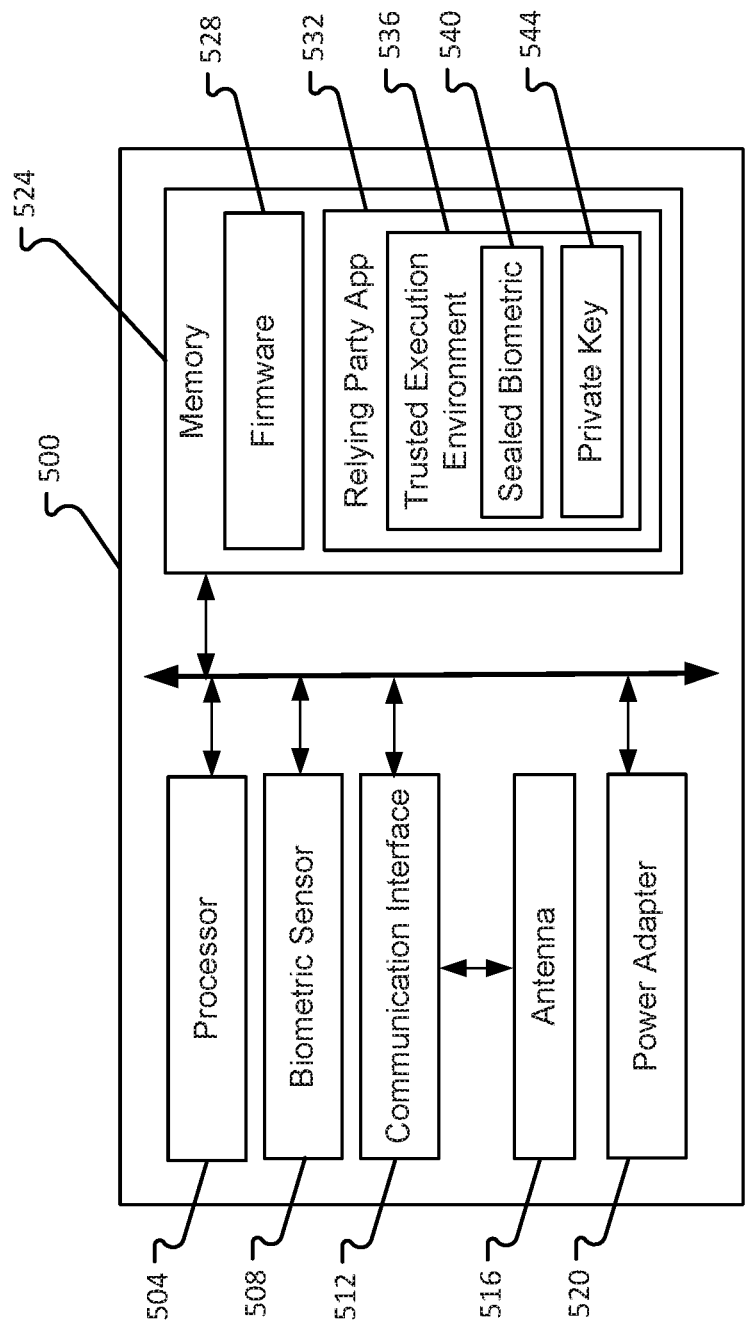
FIG. 5 shows a block diagram of a device according to an embodiment of the present disclosure.

FIG. 5 depicts a block diagram of an exemplary user device 500 suitable for use in embodiments of the present disclosure. The user device 500, which may be a mobile device or an immobile device, in addition to well-known componentry (not shown) comprises a processor 504, a biometric sensor 508, a communication interface 512, a power adapter 520, and a memory 524. Each of these components is described in greater detail below.

The processor 504 may correspond to one or multiple microprocessors that are contained within a housing of the device 500. The processor 504 may comprise a Central Processing Unit (CPU) on a single Integrated Circuit (IC) or a few IC chips. The processor 504 may be a multipurpose, programmable device that accepts digital data as input, processes the digital data according to instructions stored in its internal memory, and provides results as output. The processor 504 may implement sequential digital logic as it has internal memory. As with most known microprocessors, the processor 504 may operate on numbers and symbols represented in the binary numeral system. The processor 504 may be configured to execute instructions stored in the memory 524.

The biometric sensor 508 may be any known biometric sensor, including a fingerprint scanner, a retinal scanner, an iris scanner, a microphone, a camera (which may be used, for example, for capturing a picture of a face or any other biometric), and a video camera (which, again, may be used, by way of example, for capturing a series of images or a video of a face or any other biometric). In some embodiments, the user device 500 may comprise a plurality of biometric sensors 508, which may be the same as each other or different from each other. Biometrics captured by the biometric sensor 508 may be stored in the memory 524.

The communication interface 512 may be used, for example, to communicate with a communication network such as the communication network 404, and/or to communicate directly with a relying party server 408 and/or with a trusted agent 412. The communication interface 512 may be useable not only for communications related to the content of the present disclosure, but also for other communications for which a user device 500 may be used, including but not limited to communications relating to browsing the Internet, posting to social media, making voice and/or video calls, and streaming audio and/or video.

The communication interface 512 may utilize any known wired and/or wireless communication protocol. Examples of wired protocols that may be utilized by the communication interface 512 include RS-232, RS-422, RS-485, I²C, SPI, IEEE 802.3, IEEE 802.11, and/or TCP/IP. Examples of wireless protocols that may be utilized by the communication interface 512 include IEEE 802.11 protocols such as but not limited to IEEE 802.11a/b/g/n/ac/ax, Bluetooth®, Bluetooth® Low Energy (BLE), FeliCa, Zigbee®, GSM, LTE, 3G, 4G, 5G, RFID, and NFC. The communication interface 512 may comprise hardware (e.g. an Ethernet port, a wireless radio), software (e.g. drivers, firmware, applications), or a combination thereof to enable communications to and from the user device 500. Where the communication interface 512 uses a wireless communication protocol, the communication interface 512 may also comprise an antenna 516 for sending and receiving signals wirelessly.

The power adapter 520 receives power (e.g., electricity) from an external source and routes the power to the various components of the user device 500 as needed, while also performing power transformation and signal conditioning functions as necessary to ensure that power is provided to each component of the user device 500 according to the specifications of the component in question. In some embodiments, the power adapter 120 may comprise a backup power source (e.g., one or more batteries, a generator, a solar cell) for ensuring the continuous provision of power to the user device 500, even if the primary power source (which may be, for example, a public electricity grid) is interrupted. In some embodiments, the power adapter 520 may comprise a battery or other energy storage device as a primary power source, and the power adapter 520 may be configured to receive power from an external source for recharging the battery or other energy storage device.

The memory 524 may correspond to any type of non-transitory computer-readable medium. In some embodiments, the memory 524 may comprise volatile or non-volatile memory and a controller for the same. Non-limiting examples of memory 524 that may be utilized in the device 500 include RAM, ROM, buffer memory, flash memory, solid-state memory, or variants thereof.

The memory 524 stores any firmware 528 needed for allowing the processor 504 to operate and/or communicate with the various components of the user device 500, as needed. The firmware 528 may also comprise drivers for one or more of the components of the device 500.

The memory 524 may also comprise a relying party app 532 stored therein, comprising instructions for execution by the processor 504. The relying party app 532 may comprise, for example, instructions for establishing a trusted execution environment 536, which provides a secure storage space for enrolled or bound biometrics 540 and for private keys 544. Storing the bound biometric 540 and the private key 544 in a trusted execution environment helps to prevent tampering with either. When secure information from the trusted execution environment 536 needs to be transferred (e.g. to a trusted agent via NFC), the secure information can be encrypted by the processor 504 before transfer.

Turning now to the air travel use case of the present disclosure, experts of the air travel industry, such as the International Air Transport Association, have suggested that air travel security and convenience can be enhanced by enabling travelers, during their processing through an airport, to confirm their identity using their smart phones. Some or all of this process might also be automated, such as through the use of self-serve kiosks. This has been referred to as a "single travel token scheme." It has further been suggested that biometrics can aid the process, but there are challenges:

First, the traveler must ideally be able to represent and demonstrate his or her identity to parties representing many different stakeholders in many different geographies. These include government security personnel, airline personnel, and airport personnel. These parties represent a very large number of government and private organizations around the world, including airlines, airports, and nations. A method based on open technical standards is highly desirable for this reason.

Second, the traveler's connectivity to a network such as by GSM or Wi-Fi cannot be assumed, given that many travelers will be in regions without roaming service, and not all airports will provide free network service. So, all data interchange with traveler smart phones must be through other means, such as by NFC or QR code.

An exemplary embodiment describes methods that can at least address and overcome these challenges. One exemplary embodiment also describes how biometric identity can be used in compliance with the open FIDO standards, in order to solve the single travel token challenge for the traveler. One exemplary embodiment provides system architecture and workflows in support of a standards-based, biometrics-enabled single travel token scheme that allows a traveler to register his or her biometrics on his or her smart phone device, and then use biometric authentication to demonstrate the authenticity of his or her claimed identity.

Figure 6:
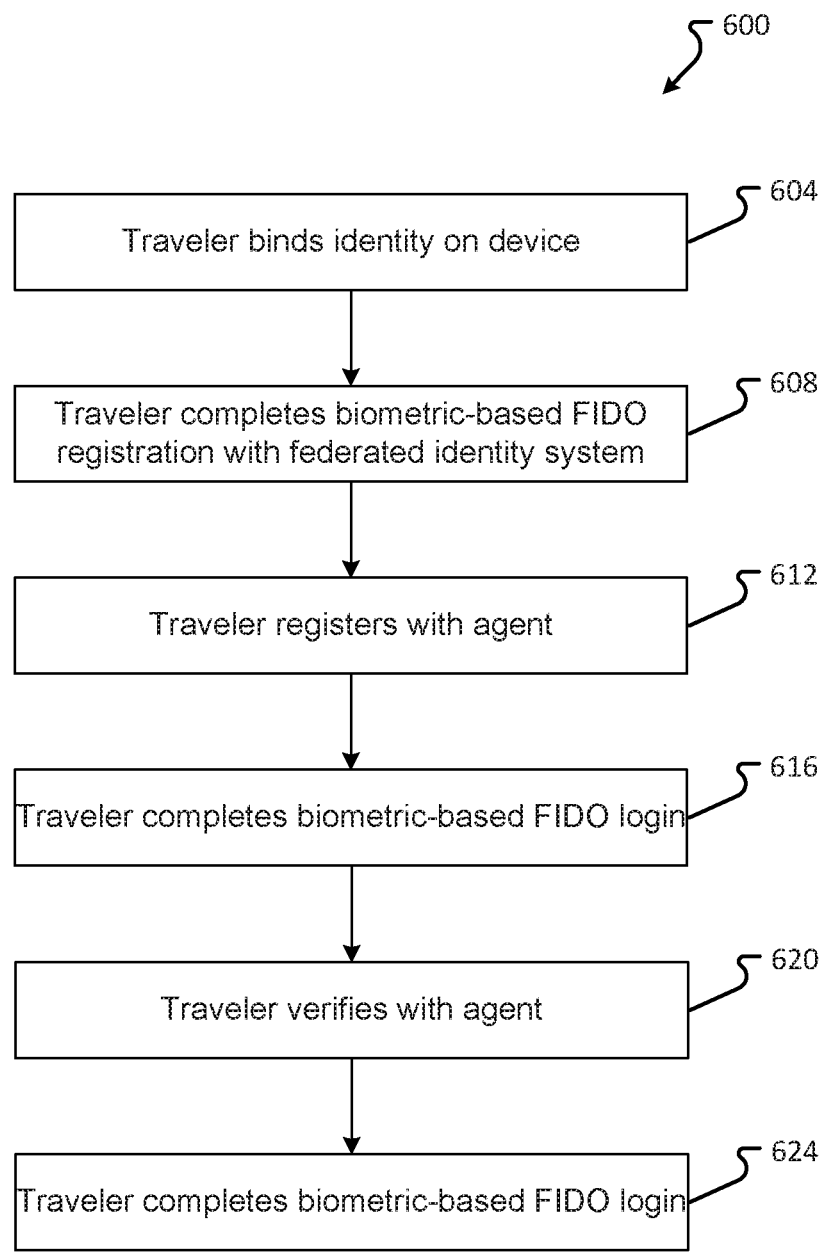
FIG. 6 is a flowchart of a process according to one embodiment of the present disclosure.

Turning now to FIG. 6, in a biometric single token travel scheme 600, a traveler binds his or her identity (which may include, for example, the traveler's biometrics, e.g. fingerprint; selfie for face recognition purposes; iris and/or retina patterns; and the traveler's travel credentials, e.g. passport, visas) in a single digital record on his or her mobile device (step 604).

The traveler then completes biometric-based FIDO registration with a federated identity system (step 608). This involves writing a public portion of a digital token to a private permissioned blockchain, which is shared by the different airlines and their partners, while a private portion of the digital token is stored on the traveler's mobile device. As a result, the traveler's mobile device holds the traveler's physical identity, any identity documents, and also the digital token created for blockchain. The traveler's digital token is attested by the traveler's airline before the traveler begins travel. The attested digital token may then be used as identification to access different airline services at various points anywhere in the world. The main benefits with this approach are increased speed of processing at entry points without compromising security and better customer satisfaction.

The traveler registers with an airline agent by physically presenting himself or herself to the agent, together with his or her passport (step 612).

The traveler next completes a biometric-based FIDO login (step 616). When prompted (via push notification if network access is available, or by the agent or in some other manner if network access is not available), the traveler provides biometric verification on their mobile device. Where network access is not available, or where network use is undesirable, the traveler may tap the mobile device to or on an NFC sensor for biometric verification purposes. The biometric verification comprises providing the agent with the traveler's credentials and cryptographic hashes of the biometric and blockchain tokens. The airline agent verifies the user's credentials and cryptographic hashes of the biometric and blockchain tokens received from the mobile device. If all are verified, the airline issues a claim for the traveler on the blockchain.

The traveler now begins his journey, and at every entry point, shows his passport to an agent (step 620) and is prompted for biometric verification using the mobile device (step 624). In each instance, the traveler's credentials and the claim issued by the airline are verified from the blockchain, the cryptographic hash of the biometric is compared, and the traveler is given entry.

These steps will now be described in greater detail in connection with three processes: first, binding the traveler's biometric and identity, in effect binding the traveler's identity to his or her mobile device; second, presenting the traveler's credentials to an airline's live agent for verification and, if everything is verified, for issuance of certification/claims and writing of the claim(s) to the blockchain; and third, verifying the traveler's identity with a kiosk/partner agent, which verifies the traveler's identity and link that identity with certifications/claims issued by the airline on the blockchain. The traveler is granted entry if all verifications are successful.

Figure 7A:
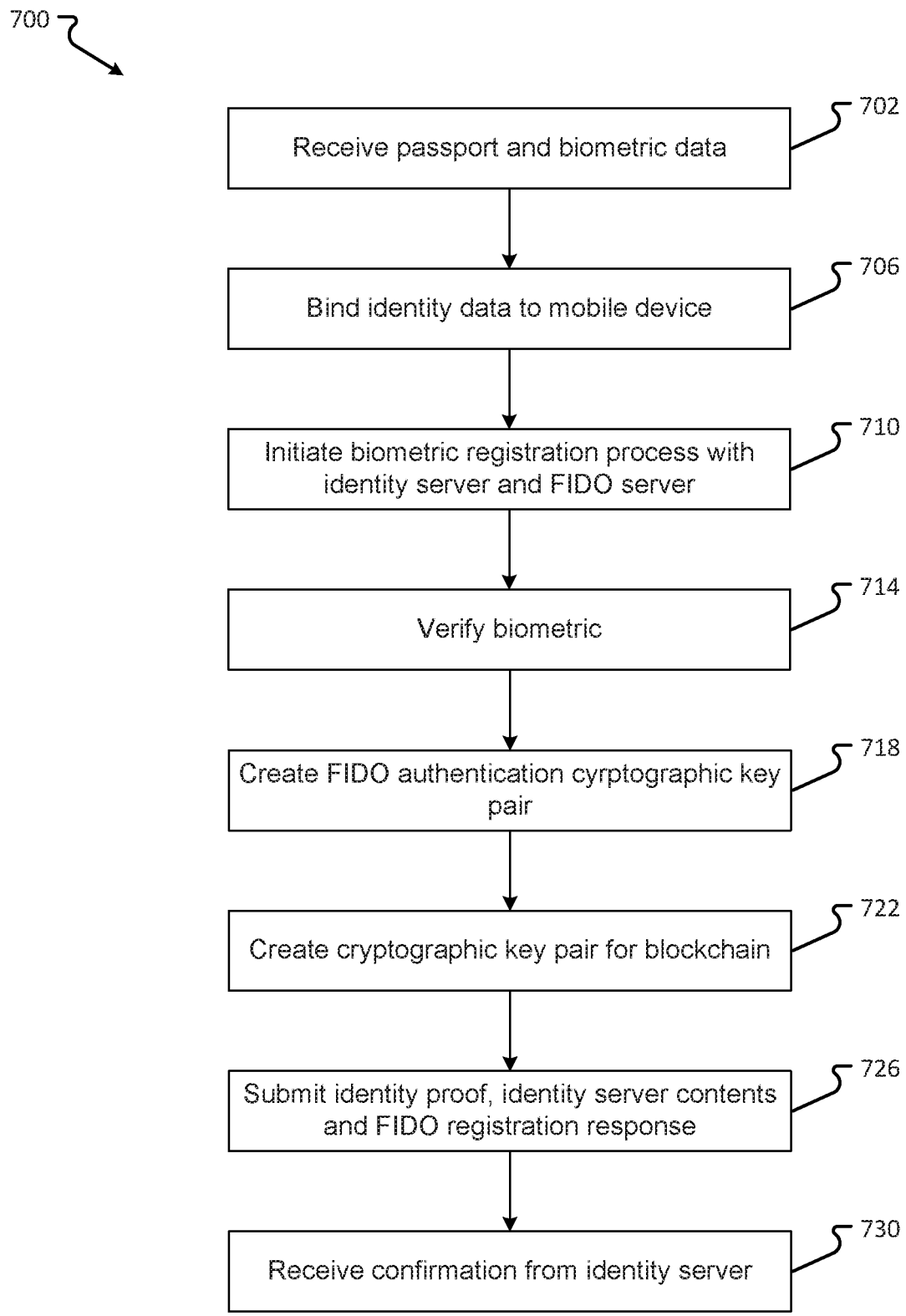
FIG. 7A is a flowchart of a process according to another embodiment of the present disclosure.

A flowchart showing the process of binding and registering a traveler's identity is shown in FIG. 7A. At step 702, a traveler app running on the traveler's mobile device receives passport and biometric data. The passport data may be received, for example, by scanning the passport (or a barcode thereon) with a camera of the mobile device, or by taking a picture of the passport with such a camera, or by receiving the data via a wired or wireless connection. The biometric data may be received, for example, through a biometric sensor of the mobile device, or through a biometric sensor in wired or wireless communication with the mobile device. The biometric data may comprise, by way of example and not limitation, fingerprint data, face data, or iris or retinal pattern data.

In some embodiments, identification document data other than or in addition to passport data may be used in the method 700. Such identification data may include, for example, driver's license data, birth certificate data, social security data, and data corresponding to any other identification document.

The traveler app binds the passport and biometric data to the mobile device in step 706. As a result, the passport and biometric data is securely stored within the mobile device, and cannot be single-handedly modified.

In step 710, the traveler app initiates a biometric registration process with an identity server and a FIDO server, during which step a message is sent from the traveler app to the identity server. In response, the traveler app receives a random challenge, along with an authenticator policy, which prompts the traveler app for biometric verification.

The traveler app receives new biometric data from the traveler, via, for example, a biometric sensor on the traveler's mobile device or in wired or wireless contact with the traveler's mobile device. By comparing the new biometric data to the biometric data bound to the mobile device in step 706, the traveler app verifies the traveler's biometric (step 714).

Once the biometric is verified, the traveler app creates a cryptographic key pair for FIDO authentication (step 718). The private FIDO key is saved on the mobile device, and a registration response package containing the public FIDO key is created by a FIDO authenticator included in the traveler app. The private FIDO key may be saved, for example, in a secure storage area of the mobile device. A Trusted Execution Environment may be used for this purpose.

The traveler app also creates a cryptographic key pair for blockchain (step 722). A private key for blockchain is saved on the mobile device, and is used to sign a newly created identity proof. The traveler app packages a public key for blockchain, together with a hash of the biometric bound to the mobile device, into identity server contents for transmission to the identity server.

The identity proof, identity server contents and FIDO registration response are submitted to the identity server in an encrypted message (step 726). As noted above, the identity proof is signed with the private key for blockchain. The encrypted message includes a UniqueID corresponding to the traveler in question, as well as the public key for writing to blockchain (contained within the identity server contents), the public key for FIDO authentication (contained within the FIDO registration response), and a hash of the biometric bound to the mobile device (also contained within the identity server contents). The identity server saves the unique identity proof onto the blockchain, and forwards the FIDO registration response (and thus the public key for FIDO authentication) to the FIDO server. The identity server also persists the identity content package, including the public key for blockchain and the biometric image hash, to its database. Once these actions are complete, the traveler app receives a confirmation message from the identity server (step 730).

Figure 7B:
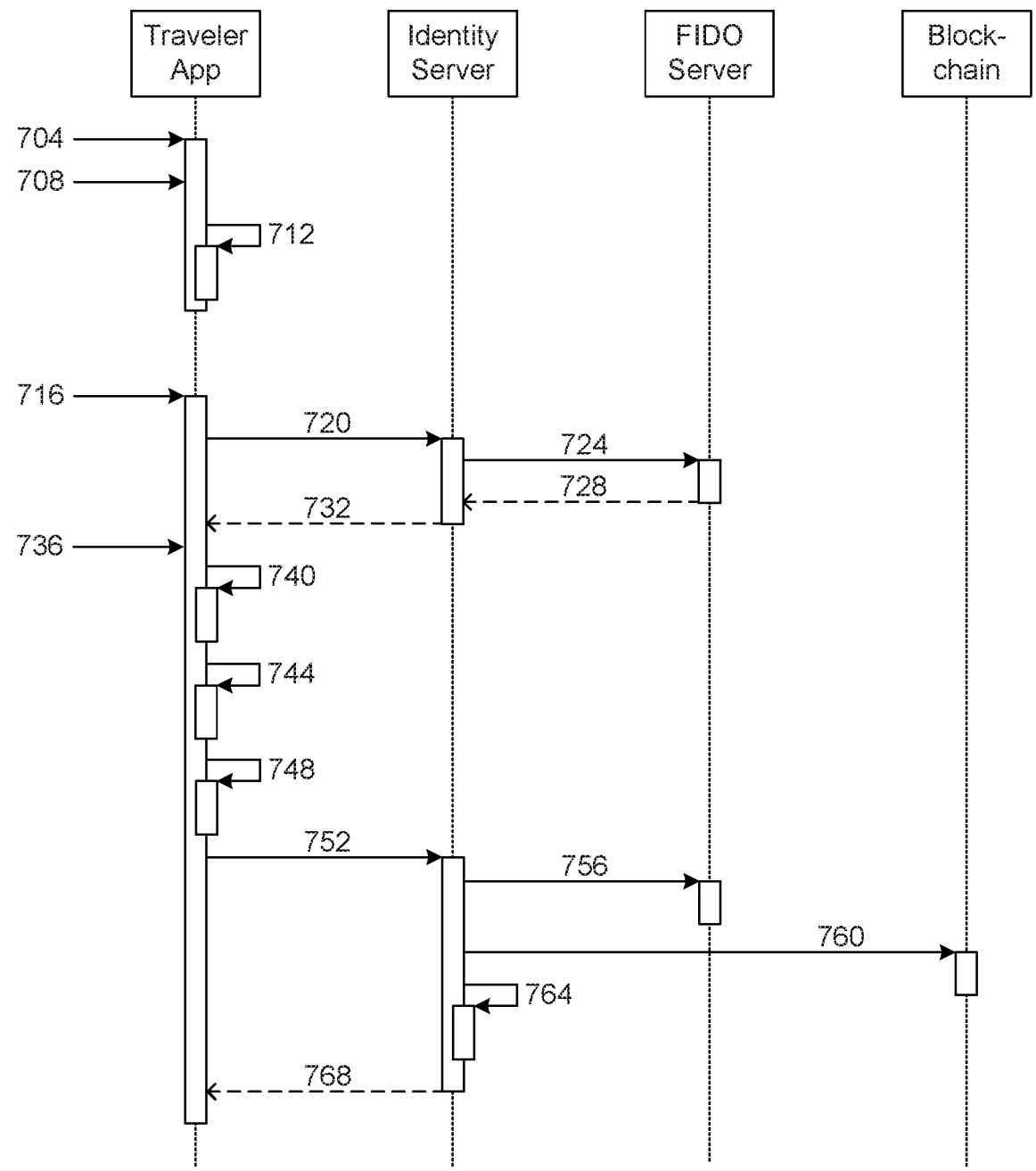
FIG. 7B is a sequence diagram corresponding to the process of FIG. 7A.

FIG. 7B provides a sequence diagram showing messages sent and received during the process of binding and registering a traveler's identity. The messages are received by and sent from a traveler app running on a traveler's mobile device; an identity server; a FIDO server; and a private permissioned blockchain accessible to, for example, the airlines and their partners. The identity server and FIDO server may be co-located and may reside in the cloud. Additionally, the identity server and FIDO server may be controlled by the same party that controls the blockchain. Message 704 initiates an identity binding sequence on the traveler app for binding the traveler's identity to the mobile device on which the traveler app is running. Message 708 provides identification document data (e.g. passport data, driver's license data) and biometric data (e.g. fingerprint data, face data, retinal or iris pattern data) to the traveler app. The identification document data and biometric data may be received, for example, from a camera, fingerprint sensor, or any other appropriate sensor on or associated with the mobile device. In some embodiments, some or all of the data may be received, for example, via a wired or wireless communication transceiver. The message 712, which is originated and received by the traveler app, binds the identity data (including the identification document data and the biometric data) to the mobile device.

Once the identity data is bound to the mobile device, it must also be registered with the identity server and FIDO server. Message 716 initiates the registration process at the traveler app, which sends a registration request message 720 to the identity server. The identity server, in turn, sends a registration request message 724 to the FIDO server. In response, the FIDO server sends a challenge message 728 to the identity server, which the identity server passes to the traveler app as a message 732. After receipt of the challenge message 732, the traveler app receives a message 736 containing the traveler's biometric data. The message 736 may be received, for example, from or by a biometric sensor on or connected to (whether wirelessly or not) the mobile device running the traveler app.

The messages 740, 744, and 748 are all originated and received by the traveler app. The message 740 confirms that the biometric data provided in the message 736 matches the biometric data bound to the mobile device as a result of the message 712. The message 744 causes a FIDO authenticator within the traveler app to create a registration response. The message 758 causes an identity proof to be created, and also causes a hash of the biometric data and of a public key for blockchain to be packaged into identity server contents for the identity server.

The identity proof, identity server contents, and FIDO registration response are submitted to the identity server in an encrypted message 752. The identity server sends the FIDO registration response to the FIDO server in the message 756, and sends the identity proof to the blockchain in the message 760. A message 764, originated and received by the identity server, causes the identity server to persist the identity server contents to its database, after which a success message 768 is sent by the identity server to the traveler app.

As a result of the process of binding and registering a traveler's identity, the mobile device stores a UniqueID for the traveler, a biometric image and passport (or other identification document) details for the traveler, a private key for writing to blockchain, and a private key for FIDO authentication to the identity server.

Figure 8A:
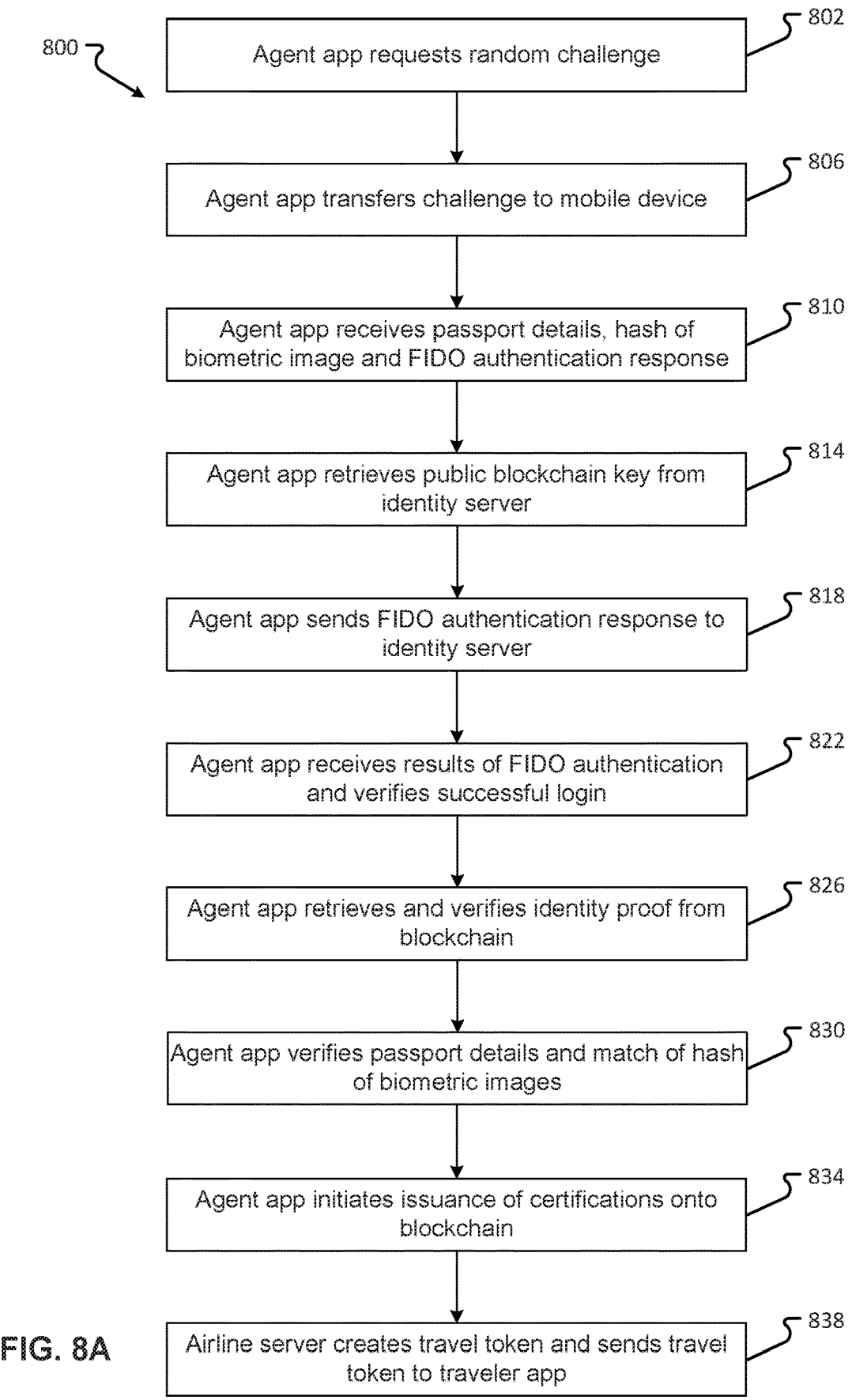
FIG. 8A is a flowchart of a process according to another embodiment of the present disclosure.

FIG. 8A depicts a flowchart for a traveler registration process 800, whereby a traveler registers with an agent. The agent uses an agent app running on a computing device, which may or may not be a mobile device. At step 802, the agent app requests a random challenge from the identity server, which forwards the request to the FIDO server. The challenge is issued and transmitted to the agent app via the identity server.

In step 806, the agent app transfers the challenge to the traveler's mobile device via a wired or wireless connection. The transfer may utilize, for example, the NFC protocol, although it may also use any other suitable protocol, including a WiFi protocol and a cellular communications protocol. The transferred challenge causes the traveler app of the traveler's mobile device to prompt the traveler to complete a biometric verification for FIDO login. If a biometric match successfully occurs, then the traveler app transfers a data package comprising passport details, a hash of the stored biometric image that matches the biometric image captured by the mobile device during the biometric verification for FIDO login, and a FIDO authentication response to the agent app, encrypted with the private blockchain key. The passport details may comprise a cryptographic hash of the passport or other identity documents. Here again, the transfer may utilize, for example, the NFC protocol, although it may also use any other suitable protocol, including a WiFi protocol and a cellular communications protocol.

The agent app, then, receives the encrypted data package at step 810. In step 814, the agent app retrieves the public blockchain key from the identity server, so that it can decrypt the data package and access the passport details, hash of biometric image, and FIDO authentication response contained therein.

At step 818, the agent app sends the FIDO authentication response to the identity server, which in turn forwards the FIDO authentication response to the FIDO server. The FIDO authentication server returns a login result. The login result is forwarded by the identity server and received by the agent app, which verifies that the login was successful, in step 822.

Once successful FIDO login has been confirmed, the agent app retrieves the identity proof from the blockchain and verifies the signature with the public blockchain key (step 826). Additionally, the agent app verifies the passport details and the match of the hash of biometric images (step 830). The verification of passport details may comprise comparing a cryptographic hash of the identity documents included in the identity proof data with a stored hash of the identity documents.

The agent then initiates issuance of certifications onto the blockchain (step 834), which are signed with the airline server's private blockchain key.

Finally, in step 838, the airline server creates a travel token, which it sends to the traveler app. When the traveler presses the travel token, a certification envelope is submitted to the identity server, which issues the EnvelopeID. The certification envelope represents a package consisting of references to traveler's identity proof and certifications on the blockchain, along with the associated travel token issued by the airline. This certification envelope is encrypted by a symmetric passcode generated and maintained by the mobile device. The EnvelopeID is the identifier issued by the identity server to identify this newly created package for later reference.

Figure 8B:
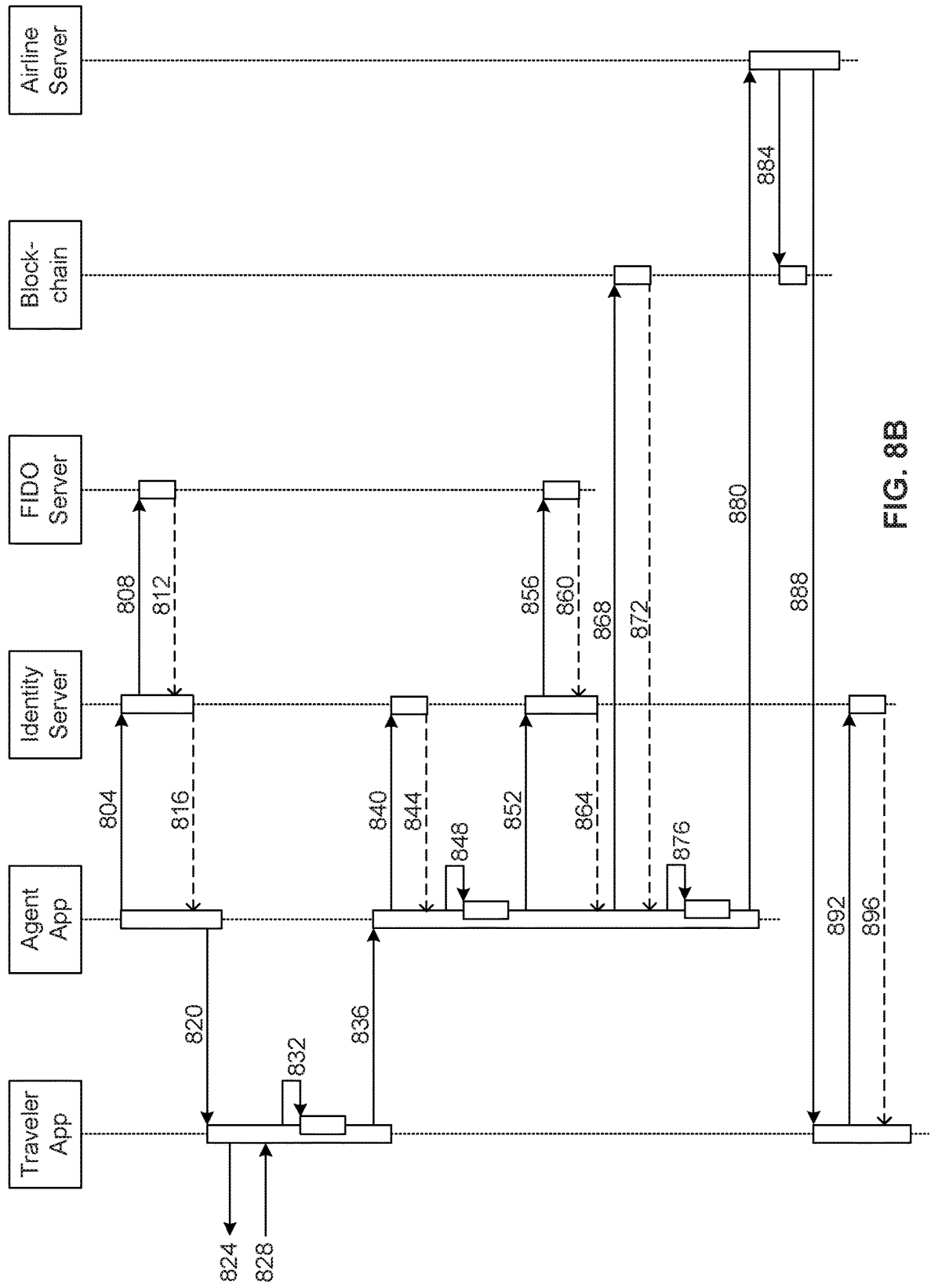
FIG. 8B is a sequence diagram corresponding to the process of FIG. 8A.

FIG. 8B depicts a sequence diagram showing messages sent and received during the process of registering a traveler with an agent. The agent may be, for example, a person utilizing a mobile device or other computing device that runs an agent app, or a kiosk equipped with a computing device that runs an agent app. The messages in this sequence diagram are received by and sent from a traveler app running on a traveler's mobile device; an agent app running on an agent's (or kiosk's) computer device; an identity server; a FIDO server; private permissioned blockchain accessible to, for example, the airlines and their partners; and an airline server.

The message 804 constitutes an authentication request issued by the agent app and sent to the identity server. The identity server forwards the authentication request to the FIDO server as message 808. In response, the FIDO server issues a challenge, which is provided to the identity server in the message 812, and then to the agent app in the message 816. The agent app transfers the challenge to the traveler app in the message 820, whether via NFC or some other wired or wireless connection.

The traveler app generates a prompt to the traveler for FIDO login, represented as message 824. The traveler app then receives biometric data from the traveler in the message 828. The traveler app verifies that the received biometric data matches the stored biometric data with message 832, which is originated and received by the traveler app.

Once a biometric match is determined to have occurred and been successful, the traveler app (perhaps after receiving a command from the user) transfers a data package containing the traveler's passport details (or other identification document information), hash of the stored biometric image that matches the received biometric data, and FIDO authentication response to the agent app, via NFC or another wired or wireless communication protocol, in the message 836. The data package is encrypted with the private blockchain key.

Upon receipt of the message 836, the agent app requests the public blockchain key from the identity server in the message 840, and receives the public blockchain key in the message 844. The message 848, originated and received by the agent app, causes the agent app to decrypt the data package received in the message 836.

The agent sends the FIDO authentication response from the data package to the identity server in the message 852, and the identity server forwards the FIDO authentication response to the FIDO server in the message 856. The FIDO server then returns a login result in the message 860, which the identity server forwards to the agent app in the message 864.

If the login result indicates a successful login, then the agent app issues a request message 868 requesting the identity proof from the blockchain, which is received via the message 872. Upon receipt, the agent app verifies the signature on the identity proof with the public blockchain key. The message 876, which originates from and is received by the agent app, causes the agent app to verify the passport details and that the biometric image hash contained in the message 836 matches a stored biometric image hash.

If the verification is successful, then the agent app initiates issuance of certification onto the blockchain with the message 880, which is sent to the airline server. The airline server, in turn, signs the certifications with the airline server's private blockchain key and sends them to the blockchain in the message 884.

The message 888 contains a travel token created by the airline server, which is provided to the traveler app. When the traveler presses the travel token in the traveler app, a certification envelope is submitted to the identity server in the message 892, and the identity server issues, in the message 896, an envelope ID.

Figure 9A:
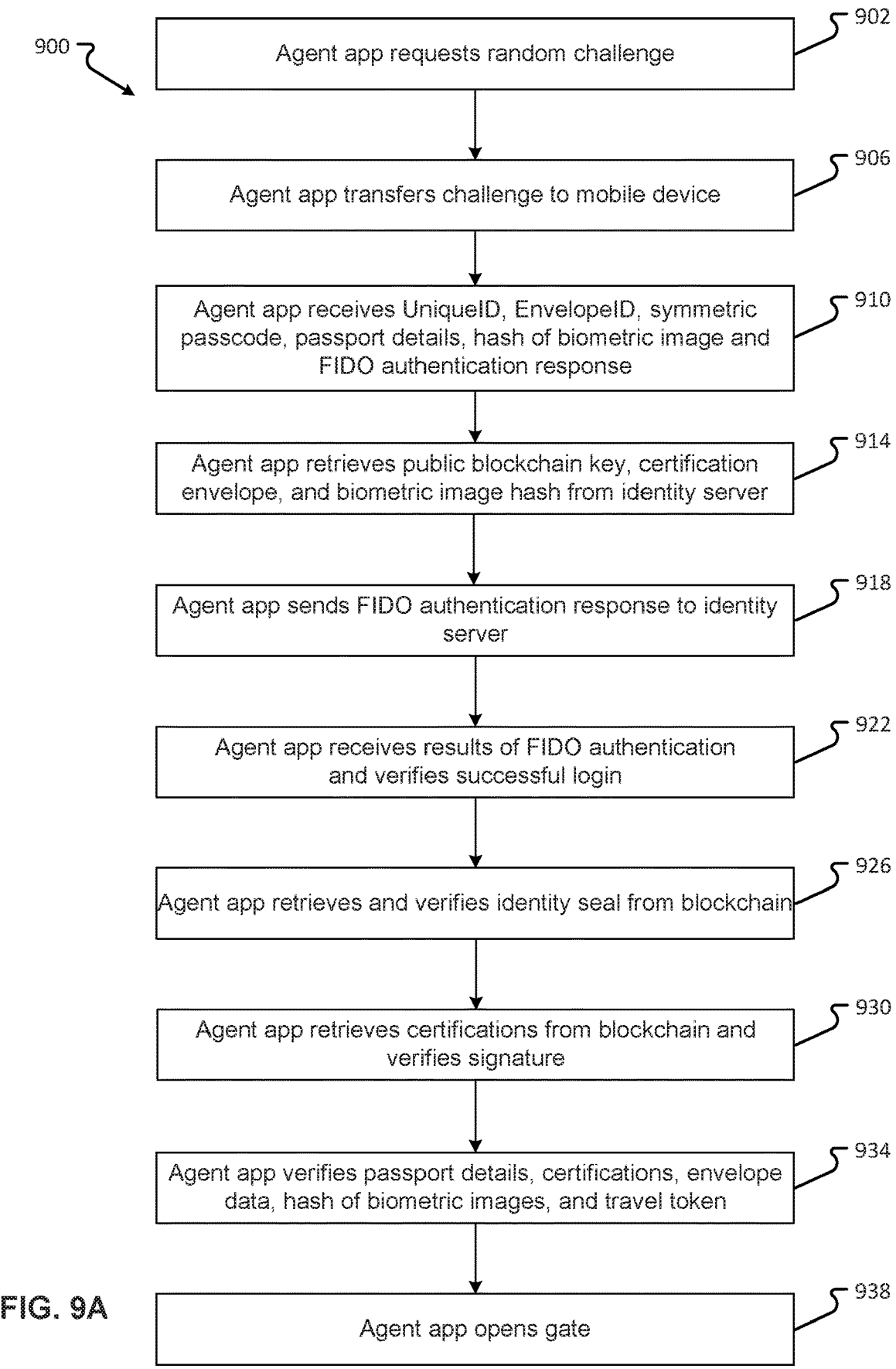
FIG. 9A is a flowchart of a process according to another embodiment of the present disclosure.

FIG. 9A depicts a flowchart for a traveler verification process 900, whereby a traveler verifies his or her identity with an agent so as to gain access to (for example) a departure gate. As in the process 800, the agent uses an agent app running on a computing device, which may or may not be a mobile device. At step 902, the agent app requests a random challenge from the identity server, which forwards the request to the FIDO server. The challenge is issued and transmitted to the agent app via the identity server.

In step 906, the agent app transfers the challenge to the traveler's mobile device via a wired or wireless connection. The transfer may utilize, for example, the NFC protocol, although it may also use any other suitable protocol, including a WiFi protocol and a cellular communications protocol. The transferred challenge causes the traveler app of the traveler's mobile device to prompt the traveler to complete a biometric verification for FIDO login. If a biometric match successfully occurs, then the traveler app transfers a data package comprising the traveler's UniqueID, EnvelopeID, symmetric passcode used by the mobile device to encrypt the certification envelope, passport details, a hash of the biometric image bound to the mobile device, and a FIDO authentication response to the agent app, encrypted with the private blockchain key. Here again, the transfer may utilize, for example, the NFC protocol, although it may also use any other suitable protocol, including a WiFi protocol and a cellular communications protocol.

The agent app, then, receives the encrypted data package at step 910. In step 914, the agent app retrieves the public blockchain key, the certification envelope, and the biometric image hash from the identity server. Using the public blockchain key, the agent app decrypts the data package to access the contents thereof.

At step 918, the agent app sends the FIDO authentication response to the identity server, which in turn forwards the FIDO authentication response to the FIDO server. The FIDO authentication server returns a login result. The login result is forwarded by the identity server and received by the agent app, which verifies that the login was successful, in step 922.

Once successful FIDO login has been confirmed, the agent app retrieves the identity proof from the blockchain and verifies the signature with the public blockchain key (step 926). The agent then retrieves certifications from the blockchain (step 930) and verifies the signature thereon.

In step 934, the agent app verifies the passport details, certifications, envelope data, hash of biometric images, and travel token. If each of these verifications is successful, the agent app in step 938 opens the departure gate (or otherwise permits the desired access).

Figure 9B:
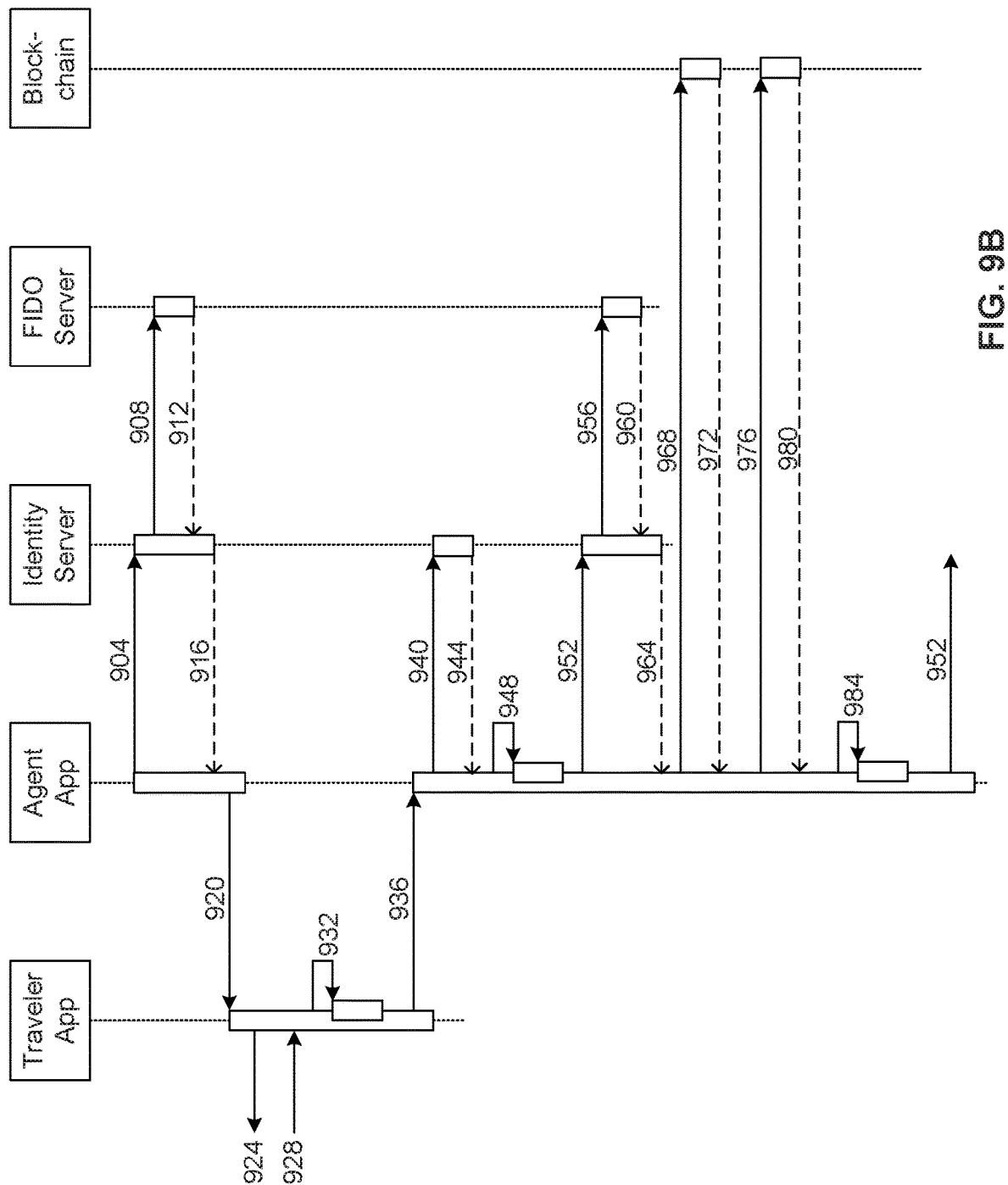
FIG. 9B is a sequence diagram corresponding to the process of FIG. 9A.

Turning now to FIG. 9B, a sequence diagram of the traveler verification process involves the traveler app, the agent app, the identity server, the FIDO server, and the blockchain. The message 904 constitutes an authentication request issued by the agent app and sent to the identity server. The identity server forwards the authentication request to the FIDO server as message 908. In response, the FIDO server issues a challenge, which is provided to the identity server in the message 912, and then to the agent app in the message 916. The agent app transfers the challenge to the traveler app in the message 920, whether via NFC or some other wired or wireless connection.

The traveler app generates a prompt to the traveler for FIDO login, represented as message 924. The traveler app then receives biometric data from the traveler in the message 928. The traveler app verifies that the received biometric data matches the stored biometric data with message 932, which is originated and received by the traveler app.

Once a biometric match is determined to have occurred and been successful, the traveler app (perhaps after receiving a command from the user) transfers a message 936 to the agent app comprising a data package containing the EnvelopeID, the UniqueID, a symmetric passcode, the traveler's passport details (or other identification document information), hash of the stored biometric image or data determined to match the receive biometric image or data, and FIDO authentication response, via NFC or another wired or wireless communication protocol. The data package is encrypted with the private blockchain key.

Upon receipt of the message 936, the agent app requests the public blockchain key, the certification envelope, and the image hash from the identity server in the message 940, and receives the requested data in the message 944. The message 948, originated and received by the agent app, causes the agent app to decrypt the data package received in the message 936.

The agent sends the FIDO authentication response from the data package to the identity server in the message 952, and the identity server forwards the FIDO authentication response to the FIDO server in the message 956. The FIDO server then returns a login result in the message 960, which the identity server forwards to the agent app in the message 964.

If the login result indicates a successful login, then the agent app issues a message 968 requesting the identity proof from the blockchain, which is received via the message 972. Upon receipt, the agent app verifies the signature on the identity proof with the public blockchain key. The message 976 requests the certifications from the blockchain, which are received in the message 980. The message 984, which is originated and received by the agent app, causes the agent app to verify the passport details, certifications, envelope data, hash of biometric images, and travel token of the traveler. If these verifications are successful, then the agent app sends a message 952 to open the departure gate (or to otherwise grant desired access).

The present disclosure also has applications in financial services. The transaction of financial assets between parties often requires third party intermediaries, thus reducing the transparency of those transactions and complicating the auditing process. By recording the transfer of digital assets within a blockchain-based database, third party intermediaries can be eliminated. The transactions recorded on the blockchain are open, permanent, and immutable, making the auditing process more open and reliable. Blockchain also allows the possibility of deploying "smart code" or smart contracts which can trigger different actions, when specific events occur. These actions may, in turn, request user consents before proceeding with further steps. It will be very useful for relying parties to verify the authenticity of a user giving permissions for such asset transactions. This will ensure that the transfer and issuance of funds are authorized by the right people. Decentralized biometric-based user confirmations would be very useful in such scenarios.

Still another use case in the financial services industry is the use of blockchain towards simplified management and sharing of customer identity proofing checks, often referred to as a "Know Your Customer" (KYC) process. This can reduce cost, fraud, and money laundering risks (including risks related to anti-money laundering (AML) requirements) and potential fines. Biometric-based authentication is useful while administering KYC checks as discussed in more detail later in this document.

In the financial services industry, there will be different partners interested in verifying the identity documents of an individual. For each partner to independently verify the identity documents and conduct background checks of the individual is expensive and results in duplication of efforts. Typically, a "Know Your Customer" (KYC) request can take 30 to 50 days to be conducted to a satisfactory level, and can cause unnecessary delays in transactions.

Blockchain allows the possibility for a Trusted Identity Provider (e.g., a bank or an independent agency) to conduct KYC compliance tasks, including verifying identity documents of an individual and, in some embodiments, conducting a background check. Once the Trusted Identity Provider has completed the KYC compliance tasks, the Trusted Identity Provider can put a summary of those documents or referral points to those documents in a private permissioned blockchain. This data can then be accessed by other banks or by other organizations such as insurers and loan providers, thus enabling those organizations to avoid repeating their own KYC checks.

There are plenty of privacy issues to be dealt with here. A Trusted Identity Provider should be permitted to disclose a person's personal data only after obtaining consent from the individual. There may even be applicable privacy protection regulations. Strong biometric authentication can help to ensure that the person giving the consent is the same person whose documents are being disclosed.

As part of the "Know Your Customer" process, the Trusted Identity Provider could request the user to capture his or her biometric via his or her mobile phone. The biometric will be retained only on the device, and only a cryptographic hash of the biometric, along with the public authentication key, will be sent to the server. This data will be retained along with the person's KYC documents in the Trusted Identity Provider's database. When the Trusted Identity Provider needs to share the information with a third party, the Trusted Identity Provider can ask for the person's consent on the person's registered mobile device. This will trigger a biometric capture and verification on the device, and the cryptographic hash of the corresponding biometric (e.g. the biometric that matches the captured biometric) is sent up to the Trusted Identity Provider's server, along with the other details specified herein. The server can compare the cryptographic hashes to ensure that the right biometric has been used, and that the person who gave the consent is authentic.

Figure 10:
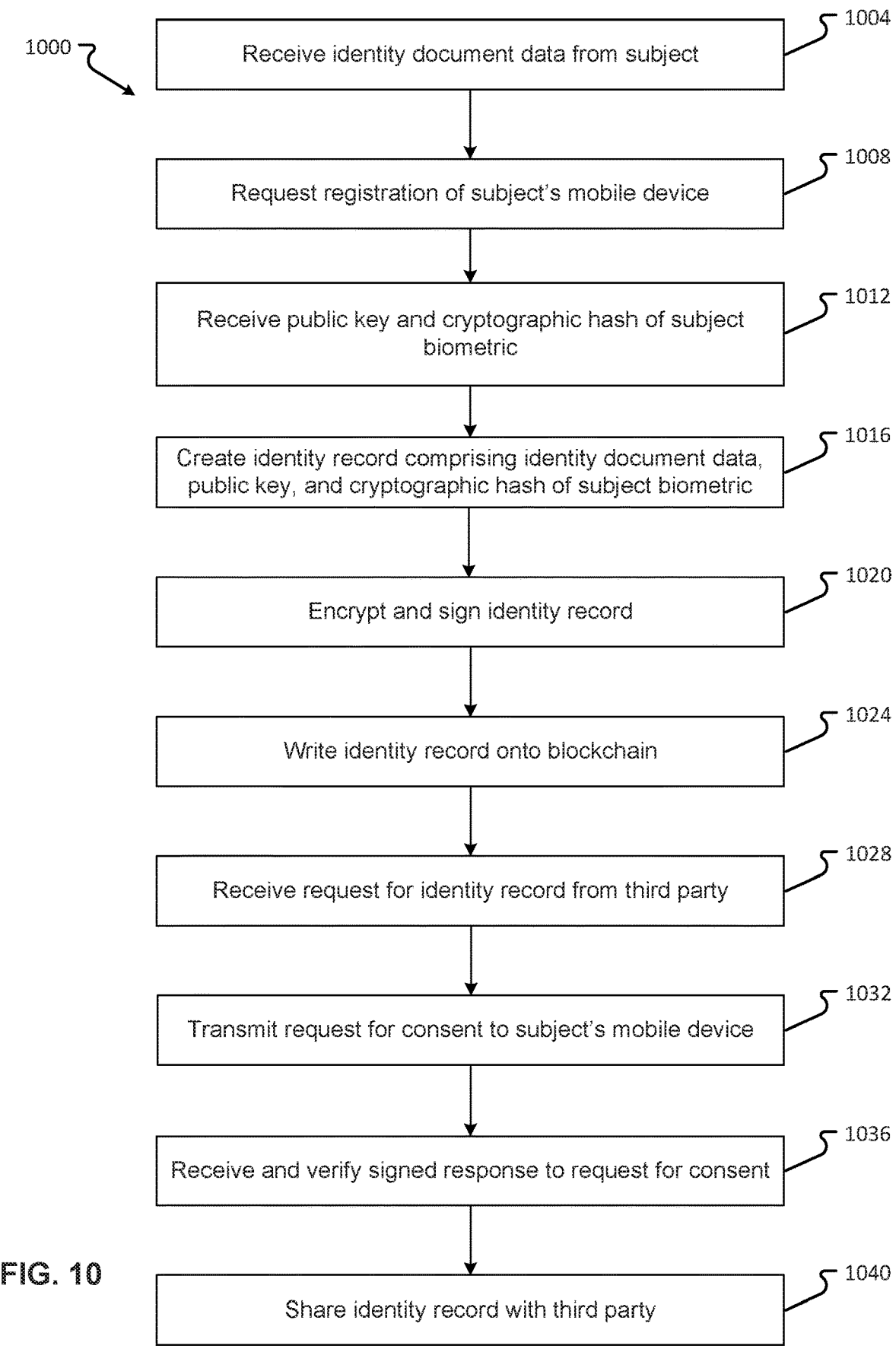
FIG. 10 is a flowchart of a process according to another embodiment of the present disclosure.

Turning, then, to FIG. 10, an identity proofing method 1000 includes the step of receiving identity document data from a subject individual (step 1004). The identity document data may comprise, for example, data from or regarding the subject individual's passport, birth certificate, driver's license, and/or social security card or number. The identity document data may comprise scans of identity documents, information extracted from identity documents or from scans of identity documents, and/or information referring to identity documents. The identity document data may be received by a server belonging to or managed or used by a trusted identity provider. The trusted identity provider may be, for example, a bank or other financial institution, an insurer, a loan provider, or a government institution.

Additionally, the method 1000 comprises requesting registration of the subject individual's mobile device (step 1008). The subject individual may be notified of the registration request through an app associated with the trusted identity provider and running on the subject individuals' mobile device. The subject individual may also be notified of the registration request via text, email, or other communication methods or protocols. In some embodiments, the request may be transmitted to the mobile device via a wired or wireless connection. The request may be made directly to the subject individual's mobile device, or the request may be transmitted to the subject individual's mobile device via a local or wide area network. The request may be transmitted through a communication interface of the trusted identity provider's server.

Upon receiving the registration request, the subject individual provides a biometric to his or her mobile device, through a camera, a fingerprint sensor, or any other biometric sensor on or associated with the mobile device. The mobile device, in turn, creates a cryptographic key pair for authentication, and saves the private key to the mobile device in a secure storage area of the mobile device.

At step 1012, the trusted identity provider server receives the public key of the cryptographic key pair, as well as a cryptographic hash of the subject biometric. The data may be received via a wired or wireless connection. The data may be received directly, or indirectly through a local area network or a wide area network. The data may be sent using any secure data transmission protocol. The trusted identity provider server combines this data with the identity document data received in step 1004 to create an identity record (step 1016).

At step 1020, the trusted identity provider server encrypts the identity record and signs the identity record with the trusted identity provider's private blockchain key. At step 1024, the trusted identity provider server writes the identity record to the blockchain. The blockchain may be, for example, a private permissioned blockchain.

When a third-party institution wants access to an identity record (as an alternative to completing KYC compliance tasks at the institution's own time and expense), the institution transmits a request for the identity record to the trusted identity provider server (step 1028). The request may be transmitted, for example, over a wired or wireless connection. In some embodiments, the request may arrive via the cloud or another wide area or local area network, while in other embodiments, the request may be communicated directly to the trusted identity provider server.

Upon receipt of the identity record request from the third-party institution, the trusted identity provider server transmits a request for consent to the subject individual's mobile device (step 1032). The request may be made through an app associated with the trusted identity provider and running on the subject individuals' mobile device. The request may also be sent via text, email, or other communication methods or protocols. In some embodiments, the request may be transmitted to the mobile device via a wired or wireless connection. The request may be made directly to the subject individual's mobile device, or the request may be transmitted to the subject individual's mobile device via a local or wide area network.

Upon receipt of the consent request, the subject individual (if he or she wishes to provide consent) completes biometric verification on his or her mobile device. More specifically, the subject individual provides his or her biometric to the mobile device through an appropriate biometric sensor on or associated with the mobile device, which the mobile device compares to the biometric received during mobile device registration. If the mobile device detects a match, then the mobile device creates a package that includes the cryptographic hash of the originally registered biometric, the challenge sent from the server and a cryptographic hash of transaction text to which the user gave the consent, and signs this package with the private authentication key securely stored on the device. The signed package is then sent by the mobile device to the trusted identity provider. The data may be sent via a wired or wireless connection. The data may be sent directly, or indirectly through a local area network or a wide area network. The data may be sent using any secure data transmission protocol.

At step 1036, the trusted identity provider server receives the signed cryptographic hash of both the originally registered biometric and of the biometric provided in response to the consent request and determined by the mobile device to match the originally registered biometric. The trusted identity provider server also uses the public authentication key received from the mobile device in step 1012 to verify that the signature of the received cryptographic hashes is authentic, and further verifies the received cryptographic hashes.

If the trusted identity provider server successfully verifies the authenticity of the signature and of the cryptographic hashes, then the trusted identity provider shares the identity record with the third-party institution that requested the identity record (step 1040). The sharing may comprise transmitting the identity record to the third-party institution, or granting the third-party institution permission to view and/or access the identity record on the private permission blockchain, or displaying the identity record to the third-party institution without actually transferring the identity record to the third-party institution.

The travel and financial use cases described above present only non-limiting examples of how aspects of the present disclosure may be implemented. Aspects of the present disclosure may be implemented in other environments as well. For example, the efficient management and sharing of patient records between healthcare providers is a significant challenge facing healthcare, with direct impacts to patient care. Each healthcare provider maintaining its own versions of a patient's record increases the chances of error and delay in administering appropriate treatments. A private permissioned blockchain between health-care providers could make the sharing of the health records particularly efficient and error-proof. Patients would then be able to approve or deny any sharing or changes to their data, helping to ensure a higher level of privacy and greater consumer control. Decentralized biometric-based authentication will be particularly useful in such scenarios, to ensure that the patient is really who he/she claims to be.

As another example, the transferring of digital assets such as shares, bonds or any other equivalent service or goods requires intermediaries such as clearing houses and banks. The key properties provided by blockchain such as immutability, transparency and ease of auditing make it an ideal platform to eliminate the need for third-party intermediaries, optimizing the speed of a trade transfer process and thus reducing costs. Any trade transfer process requires user confirmation and authentication. Ensuring the user identity with strong decentralized biometric authentication will be helpful to reduce fraud.

The various embodiments and variations thereof illustrated in the accompanying figures and throughout this document are given by way of example and are not meant to limit the scope of the invention.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like.

Exemplary aspects are directed toward:

A decentralized biometric identity authentication method, comprising:
  enrolling a user biometric, the enrolling comprising:
    receiving first factor credentials via a user interface of a mobile device;
    capturing a first user biometric with a biometric sensor associated with the mobile device;
    securely saving the first user biometric to a memory of the mobile device;
    calculating, with a processor of the mobile device, a first cryptographic hash of the first user biometric; and
    transmitting the first cryptographic hash via a communication interface of the mobile device; and
  registering the user biometric, the registering comprising:
    capturing a second user biometric with the biometric sensor;
    comparing, with the processor, the second user biometric to the first user biometric;
    generating, with the processor, a cryptographic key pair comprising a private key and a public key;
    securely saving the private key to the memory;
    preparing, with the processor, a registration package comprising the public key and a second cryptographic hash of the second user biometric; and
    transmitting the registration package via the communication interface.

Any of the aspects herein, further comprising:
  receiving, via the communication interface, a challenge;
  capturing a third user biometric with the biometric sensor;
  comparing, with the processor, the third user biometric with the first user biometric;
  preparing, with the processor, a login bundle comprising the challenge and a third cryptographic hash of the third user biometric;
  signing the login bundle with the private key; and
  transmitting the signed login bundle via the communication interface.

Any of the aspects herein, wherein at least one of the first user biometric and the private key is securely saved to the memory using a Trusted Execution Environment.

Any of the aspects herein, wherein the first user biometric comprises a fingerprint, a face, a retinal pattern, an iris pattern, or a voice pattern.

Any of the aspects herein, wherein the enrolling the user biometric further comprises determining that the first factor credentials are valid.

A method of verifying a user identity, comprising:
  binding, to a mobile device of the user, identity data corresponding to the user, the binding comprising:
    receiving, at a processor of the mobile device, identification document data;
    receiving, from a biometric sensor associated with the mobile device and at the processor, first biometric data; and
    securely storing the identity data, comprising the identification document data and the first biometric data, in a memory of the mobile device; and
  registering the identity data with a remote server, the registering comprising:
    receiving, from the biometric sensor and at the processor, second biometric data;
    verifying, with the processor, that the second biometric data matches the first biometric data;
    creating, with the processor, a first cryptographic key pair comprising a first private key and a first public key;
    saving the private key in a secure storage area of a memory of the mobile device;
    creating, with the processor, a second cryptographic key pair comprising a second private key and a second public key;
    saving the second private key in the secure storage area;
    signing an identity proof with the second private key; and
    transmitting a message comprising the first public key, the second public key, a hash of the first biometric data, and the signed identity proof to the remote server via a communication interface of the mobile device.

Any of the aspects herein, wherein the identification document data comprises passport data.

Any of the aspects herein, wherein the first biometric data comprises one of a fingerprint, a face, a retinal pattern, an iris pattern, or a voice pattern.

Any of the aspects herein, wherein the first cryptographic key pair comprises a cryptographic key pair for Fast Identity Online authentication.

Any of the aspects herein, wherein the second cryptographic key pair comprises a cryptographic key pair for a blockchain.

Any of the aspects herein, wherein the remote server saves the identity proof to the blockchain.

Any of the aspects herein, wherein the message is encrypted.

Any of the aspects herein, wherein the remote server forwards the first public key to a FIDO server.

Any of the aspects herein, wherein the remote server persists the second public key and the hash of the first biometric data to a database.

A method of proofing identity, comprising:
  receiving, at a processor of a server, identity document data corresponding to a subject;
  transmitting, via a communication interface of the server, a request for registration of a mobile device corresponding to the subject;
  receiving, via the communication interface, a public key of a cryptographic key pair and a cryptographic hash of a first biometric of the subject;
  combining, with the processor, the identity document data, the public key, and the cryptographic hash into an identity record;
  signing, with the processor and using a private blockchain key, the identity record; and
  writing, with the processor, the signed identity record to a blockchain.

Any of the aspects herein, wherein the blockchain is a private permissioned blockchain.

Any of the aspects herein, further comprising:
  receiving, via the communication interface and from a third party, a request for access to the identity record;
  transmitting, via the communication interface, a consent request;
  receiving, via the communication interface, a response to the consent request;
  completing, with the processor, a verification operation on the response to the consent request; and
  sharing the identity record with the third party.

Any of the aspects herein, wherein the response to the consent request comprises a signed cryptographic hash of the first biometric and a signed cryptographic hash of a second biometric of the subject.

Any of the aspects herein, wherein the verification operation comprises verifying, with the processor and using the public key, that a signature of each of the signed cryptographic hashes of the first and second biometrics is authentic.

Any of the aspects herein, wherein the signed cryptographic hashes of the first and second biometrics are signed with a private key from a cryptographic key pair that comprises the public key.

A mobile device comprising:
  a user interface;
  a biometric sensor;
  a communication interface;
  a processor; and
  a memory storing instructions for execution by the processor that, when executed, cause the processor to:
    enroll a user biometric, the enrollment comprising:
      receiving first factor credentials via the user interface;
      capturing a first user biometric with the biometric sensor;
      securely saving the first user biometric to the memory;
      calculating a first cryptographic hash of the first user biometric; and
      transmitting the first cryptographic hash via the communication interface; and
    register the user biometric, the registration comprising:
      capturing a second user biometric with the biometric sensor;
      comparing the second user biometric to the first user biometric;
      generating a cryptographic key pair comprising a private key and a public key;
      securely saving the private key to the memory;
      preparing a registration package comprising the public key and a second cryptographic hash of the second user biometric; and
      transmitting the registration package via the communication interface.

Any of the aspects herein, wherein the method stores additional instructions for execution by the processor that, when executed, cause the processor to:
  receive, via the communication interface, a challenge;
  capture a third user biometric with the biometric sensor;
  compare, with the processor, the third user biometric with the first user biometric;
  prepare, with the processor, a login bundle comprising the challenge and a third cryptographic hash of the third user biometric;
  sign the login bundle with the private key; and transmit the signed login bundle via the communication interface.

Any of the aspects herein, wherein at least one of the first user biometric and the private key is securely saved to the memory using a Trusted Execution Environment.

Any of the aspects herein, wherein the first user biometric comprises a fingerprint, a face, a retinal pattern, an iris pattern, or a voice pattern.

Any of the aspects herein, wherein the enrolling the user biometric further comprises determining that the first factor credentials are valid.

A mobile device for verifying a user identity, comprising:
a biometric sensor;
a processor; and
a memory comprising a secure storage area, the memory storing instructions that, when executed by the processor, cause the processor to:
  bind identity data corresponding to a user, the binding comprising:
    receiving identification document data;
    receiving, from the biometric sensor, first biometric data; and
    securely storing the identity data, comprising the identification document data and the first biometric data, in the memory; and
  register the identity data with a remote server, the registering comprising:
    receiving, from the biometric sensor, second biometric data;
    verifying that the second biometric data matches the first biometric data;
    creating a first cryptographic key pair comprising a first private key and a first public key;
    saving the private key in the secure storage area;
    creating a second cryptographic key pair comprising a second private key and a second public key;
    saving the second private key in the secure storage area;
    signing an identity proof with the second private key; and
    transmitting a message comprising the first public key, the second public key, a hash of the first biometric data, and the signed identity proof via the communication interface.

Any of the aspects herein, wherein the identification document data comprises passport data.

Any of the aspects herein, wherein the first biometric data comprises one of a fingerprint, a face, a retinal pattern, an iris pattern, or a voice pattern.

Any of the aspects herein, wherein the first cryptographic key pair comprises a cryptographic key pair for Fast Identity Online authentication.

Any of the aspects herein, wherein the second cryptographic key pair comprises a cryptographic key pair for a blockchain.

Any of the aspects herein, wherein the remote server saves the identity proof to the blockchain.

Any of the aspects herein, wherein the message is encrypted.

Any of the aspects herein, wherein the message is transmitted to the remote server, and the remote server forwards the first public key to a FIDO server.

Any of the aspects herein, wherein the remote server persists the second public key and the hash of the first biometric data to a database.

A server, comprising:
a communication interface;
a processor; and
a memory storing instructions for execution by the processor that, when executed, cause the processor to:
  receive identity document data corresponding to a subject;
  transmit, via the communication interface, a request for registration of a mobile device corresponding to the subject;
  receive, via the communication interface, a public key of a cryptographic key pair and a cryptographic hash of a first biometric of the subject;
  combine the identity document data, the public key, and the cryptographic hash into an identity record;
  sign, using a private blockchain key, the identity record; and
  write the signed identity record to a blockchain.

Any of the aspects herein, wherein the blockchain is a private permissioned blockchain.

Any of the aspects herein, wherein the memory stores instructions for execution by the processor that, when executed, further cause the processor to:
  receive, via the communication interface and from a third party, a request for access to the identity record;
  transmit, via the communication interface, a consent request;
  receive, via the communication interface, a response to the consent request;
  complete a verification operation on the response to the consent request; and
  share the identity record with the third party.

Any of the aspects herein, wherein the response to the consent request comprises a signed cryptographic hash of the first biometric and a signed cryptographic hash of a second biometric of the subject.

Any of the aspects herein, wherein the verification operation comprises verifying, with the processor and using the public key, that a signature of each of the signed cryptographic hashes of the first and second biometrics is authentic.

Any of the aspects herein, wherein the signed cryptographic hashes of the first and second biometrics are signed with a private key from a cryptographic key pair that comprises the public key.

A non-transient computer-readable medium containing program instructions for causing a computer to perform a decentralized biometric identity authentication method comprising:
  enrolling a user biometric, the enrolling comprising:
    receiving first factor credentials via a user interface of a computing device;
    capturing a first user biometric with a biometric sensor associated with the computing;
    securely saving the first user biometric to a memory of the computing device;
    calculating, with a processor of the computing device, a first cryptographic hash of the first user biometric; and
    transmitting the first cryptographic hash via a communication interface of the computing device; and
  registering the user biometric, the registering comprising:
    capturing a second user biometric with the biometric sensor;
    comparing, with the processor, the second user biometric to the first user biometric;
    generating, with the processor, a cryptographic key pair comprising a private key and a public key;
    securely saving the private key to the memory;

preparing, with the processor, a registration package comprising the public key and a second cryptographic hash of the second user biometric; and transmitting the registration package via the communication interface.

Any of the aspects herein, wherein the method further comprises:

receiving, via the communication interface, a challenge;

capturing a third user biometric with the biometric sensor;

comparing, with the processor, the third user biometric with the first user biometric;

preparing, with the processor, a login bundle comprising the challenge and a third cryptographic hash of the third user biometric;

signing the login bundle with the private key; and transmitting the signed login bundle via the communication interface.

Any of the aspects herein, wherein at least one of the first user biometric and the private key is securely saved to the memory using a Trusted Execution Environment.

Any of the aspects herein, wherein the first user biometric comprises a fingerprint, a face, a retinal pattern, an iris pattern, or a voice pattern.

Any of the aspects herein, wherein the enrolling the user biometric further comprises determining that the first factor credentials are valid.

A non-transient computer-readable medium containing program instructions for causing a computer to perform a method of verifying a user identity, the method comprising:

binding, to a computing device of a user, identity data corresponding to the user, the binding comprising:

receiving, at a processor of the computing device, identification document data;

receiving, at the processor and from a biometric sensor associated with the computing device, first biometric data; and securely storing the identity data, comprising the identification document data and the first biometric data, in a memory of the computing device; and registering the identity data with a remote server, the registering comprising:

receiving, from the biometric sensor and at the processor, second biometric data;

verifying, with the processor, that the second biometric data matches the first biometric data;

creating, with the processor, a first cryptographic key pair comprising a first private key and a first public key;

saving the private key in a secure storage area of the memory;

creating, with the processor, a second cryptographic key pair comprising a second private key and a second public key;

saving the second private key in the secure storage area;

signing an identity proof with the second private key; and transmitting a message comprising the first public key, the second public key, a hash of the first biometric data, and the signed identity proof to the remote server via a communication interface of the computing device.

Any of the aspects herein, wherein the identification document data comprises passport data.

Any of the aspects herein, wherein the first biometric data comprises one of a fingerprint, a face, a retinal pattern, an iris pattern, or a voice pattern.

Any of the aspects herein, wherein the first cryptographic key pair comprises a cryptographic key pair for Fast Identity Online authentication.

Any of the aspects herein, wherein the second cryptographic key pair comprises a cryptographic key pair for a blockchain.

Any of the aspects herein, wherein the remote server saves the identity proof to the blockchain.

Any of the aspects herein, wherein the message is encrypted.

Any of the aspects herein, wherein the remote server forwards the first public key to a FIDO server.

Any of the aspects herein, wherein the remote server persists the second public key and the hash of the first biometric data to a database.

A non-transient computer-readable medium containing program instructions for causing a computer to perform a method of proofing identity, the method comprising:

receiving, at a processor of a server, identity document data corresponding to a subject;

transmitting, via a communication interface of the server, a request for registration of a computing device corresponding to the subject;

receiving, via the communication interface, a public key of a cryptographic key pair and a cryptographic hash of a first biometric of the subject;

combining, with the processor, the identity document data, the public key, and the cryptographic hash into an identity record;

signing, with the processor and using a private blockchain key, the identity record; and writing, with the processor, the signed identity record to a blockchain.

Any of the aspects herein, wherein the blockchain is a private permissioned blockchain.

Any of the aspects herein, wherein the method further comprises:

receiving, via the communication interface and from a third party, a request for access to the identity record;

transmitting, via the communication interface, a consent request;

receiving, via the communication interface, a response to the consent request;

completing, with the processor, a verification operation on the response to the consent request; and sharing the identity record with the third party.

Any of the aspects herein, wherein the response to the consent request comprises a signed cryptographic hash of the first biometric and a signed cryptographic hash of a second biometric of the subject.

Any of the aspects herein, wherein the verification operation comprises verifying, with the processor and using the public key, that a signature of each of the signed cryptographic hashes of the first and second biometrics is authentic.

Any of the aspects herein, wherein the signed cryptographic hashes of the first and second biometrics are signed with a private key from a cryptographic key pair that comprises the public key.

Means for decentralized biometric identity authentication, comprising:

means for enrolling a user biometric, the enrolling comprising:

receiving first factor credentials via a user interface of a mobile device;

capturing a first user biometric with a biometric sensor associated with the mobile device;

securely saving the first user biometric to a memory of the mobile device;

calculating, with a processor of the mobile device, a first cryptographic hash of the first user biometric; and transmitting the first cryptographic hash via a communication interface of the mobile device; and means for registering the user biometric, the registering comprising:

capturing a second user biometric with the biometric sensor;

comparing, with the processor, the second user biometric to the first user biometric;

generating, with the processor, a cryptographic key pair comprising a private key and a public key;

securely saving the private key to the memory;

preparing, with the processor, a registration package comprising the public key and a second cryptographic hash of the second user biometric; and transmitting the registration package via the communication interface.

Any of the aspects herein, The means of claim 61, further comprising:

means for receiving, via the communication interface, a challenge;

means for capturing a third user biometric with the biometric sensor;

means for comparing, with the processor, the third user biometric with the first user biometric;

means for preparing, with the processor, a login bundle comprising the challenge and a third cryptographic hash of the third user biometric;

means for signing the login bundle with the private key; and means for transmitting the signed login bundle via the communication interface.

Any of the aspects herein, wherein at least one of the first user biometric and the private key is securely saved to the memory using a Trusted Execution Environment.

Any of the aspects herein, wherein the first user biometric comprises a fingerprint, a face, a retinal pattern, an iris pattern, or a voice pattern.

Any of the aspects herein, wherein the enrolling the user biometric further comprises determining that the first factor credentials are valid.

Means for verifying a user identity, comprising:

means for binding, to a mobile device of the user, identity data corresponding to the user, the binding comprising:

receiving, at a processor of the mobile device, identification document data;

receiving, at the processor and from a biometric sensor associated with the mobile device, first biometric data; and securely storing the identity data, comprising the identification document data and the first biometric data, in a memory of the mobile device; and means for registering the identity data with a remote server, the registering comprising:

receiving, from the biometric sensor and at the processor, second biometric data;

verifying, with the processor, that the second biometric data matches the first biometric data;

creating, with the processor, a first cryptographic key pair comprising a first private key and a first public key;

saving the private key in a secure storage area of a memory of the mobile device;

creating, with the processor, a second cryptographic key pair comprising a second private key and a second public key;

saving the second private key in the secure storage area;

signing an identity proof with the second private key; and transmitting a message comprising the first public key, the second public key, a hash of the first biometric data, and the signed identity proof to the remote server via a communication interface of the mobile device.

Any of the aspects herein, wherein the identification document data comprises passport data.

Any of the aspects herein, wherein the first biometric data comprises one of a fingerprint, a face, a retinal pattern, an iris pattern, or a voice pattern.

Any of the aspects herein, wherein the first cryptographic key pair comprises a cryptographic key pair for Fast Identity Online authentication.

Any of the aspects herein, wherein the second cryptographic key pair comprises a cryptographic key pair for a blockchain.

Any of the aspects herein, wherein the remote server saves the identity proof to the blockchain.

Any of the aspects herein, wherein the message is encrypted.

Any of the aspects herein, wherein the remote server forwards the first public key to a FIDO server.

Any of the aspects herein, wherein the remote server persists the second public key and the hash of the first biometric data to a database.

Means of proofing identity, comprising:

means for receiving, at a processor of a server, identity document data corresponding to a subject;

means for transmitting, via a communication interface of the server, a request for registration of a mobile device corresponding to the subject;

means for receiving, via the communication interface, a public key of a cryptographic key pair and a cryptographic hash of a first biometric of the subject;

means for combining, with the processor, the identity document data, the public key, and the cryptographic hash into an identity record;

means for signing, with the processor and using a private blockchain key, the identity record; and means for writing, with the processor, the signed identity record to a blockchain.

Any of the aspects herein, wherein the blockchain is a private permissioned blockchain.

Any of the aspects herein, further comprising:

means for receiving, via the communication interface and from a third party, a request for access to the identity record;

means for transmitting, via the communication interface, a consent request;

means for receiving, via the communication interface, a response to the consent request;

means for completing, with the processor, a verification operation on the response to the consent request; and means for sharing the identity record with the third party.

Any of the aspects herein, wherein the response to the consent request comprises a signed cryptographic hash of the first biometric and a signed cryptographic hash of a second biometric of the subject.

Any of the aspects herein, wherein the verification operation comprises verifying, with the processor and using the public key, that a signature of each of the signed cryptographic hashes of the first and second biometrics is authentic.

Any of the aspects herein, wherein the signed cryptographic hashes of the first and second biometrics are signed with a private key from a cryptographic key pair that comprises the public key.

Any one or more of the aspects as substantially described herein.

One or more means adapted to perform any one or more of the above aspects.

Any non-transitory computer readable information storage medium that stores instructions for performing any one or more of the above aspects.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein may show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a communications network. As will be appreciated from the description, and for reasons of computational efficiency, the components of the system can be arranged at any location within a distributed network without affecting the operation of the system.

Furthermore, it should be appreciated that the various links, including communications channel(s), connecting the elements (which may not be not shown) can be wired or wireless links, or any combination thereof, or any other known or later developed element(s) that is/are capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts/operational flows have been discussed in relation to a particular exemplary sequence of events, it should be appreciated that changes to this sequence can occur without materially effecting the operation of the embodiment(s). Additionally, the exact sequence of events need not occur as set forth in the exemplary embodiments, but rather the steps can be performed by one or the other device(s) in the system. Additionally, the exemplary techniques illustrated herein are not limited to the specifically illustrated embodiments but can also be utilized with the other exemplary embodiments and each described feature is individually and separately claimable.

As will be appreciated by one skilled in the art, aspects of the present disclosure may be embodied as a system, method, and/or computer program product. Thus, aspects of the present disclosure may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

A computer readable medium as described herein may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, C #, Pascal, JAVA, JAVA Script, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's/operator's/administrator's computer, partly on such a computer, as a stand-alone software package, partly on the user's/operator's/administrator's computer and partly on a remote computer, or entirely on a remote computer or server. Any such remote computer may be connected to the user's/operator's/administrator's computer through any type of network, including a local area network (LAN) or a wide area network (WAN), or the connection may be made to an external computer (for example, through the Internet using an Internet Service Provider).

Additionally, the systems, methods and protocols described herein can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein include, but are not limited to, at least one of Qualcomm® Snapdragon® 800 and 801, Qualcomm® Snapdragon® 610 and 615 with 4G LTE Integration and 64-bit computing, Apple®

A7, A8, A8X, A9, A9X, or A10 processors with 64-bit architecture, Apple® M7, M8, M9, or M10 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJS™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer, workstation or mobile device platforms. Alternatively, the disclosed system may be implemented partially in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, mobile device, smartphone, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this disclosure.

The invention claimed is:

1. A decentralized biometric identity authentication method, comprising:
    enrolling a user biometric, the enrolling comprising:
        receiving first factor credentials via a user interface of a mobile device;
        capturing a first user biometric with a biometric sensor associated with the mobile device;
        securely saving the first user biometric to a memory of the mobile device;
        calculating, with a processor of the mobile device, a first cryptographic hash of the first user biometric; and
        transmitting the first cryptographic hash via a communication interface of the mobile device; and
    registering the user biometric, the registering comprising:
        capturing a second user biometric with the biometric sensor;
        comparing, with the processor, the second user biometric to the first user biometric;
        generating, with the processor, a cryptographic key pair comprising a private key and a public key;
        securely saving the private key to the memory;
        calculating, with the processor of the mobile device, a second cryptographic hash of the second user biometric;
        preparing, with the processor, a registration package comprising the public key and the second cryptographic hash of the second user biometric; and
        transmitting the registration package via the communication interface to a relying party server,
    wherein, when the first user biometric is securely saved in memory, the user is prevented from altering the first user biometric.

2. The method of claim 1, further comprising:
    receiving, via the communication interface, a challenge;
    capturing a third user biometric with the biometric sensor;
    comparing, with the processor, the third user biometric with the first user biometric;
    preparing, with the processor, a login bundle comprising the challenge and a third cryptographic hash of the third user biometric;
    signing the login bundle with the private key; and
    transmitting the signed login bundle via the communication interface.

3. The method of claim 1, wherein at least one of the first user biometric and the private key is securely saved to the memory using a Trusted Execution Environment.

4. The method of claim 1, wherein the first user biometric comprises a fingerprint, a face, a retinal pattern, an iris pattern, or a voice pattern.

5. The method of claim 1, wherein the enrolling the user biometric further comprises determining that the first factor credentials are valid.

6. A mobile device comprising:
    a user interface;
    a biometric sensor;
    a communication interface;
    a processor; and
    a memory storing instructions for execution by the processor that, when executed, cause the processor to:
        enroll a user biometric, the enrolling comprising:
            receiving first factor credentials via the user interface;
            capturing a first user biometric with the biometric sensor;
            securely saving the first user biometric to the memory;
            calculating a first cryptographic hash of the first user biometric; and
            transmitting the first cryptographic hash via the communication interface; and
        register the user biometric, the registration comprising:
            capturing a second user biometric with the biometric sensor;
            comparing the second user biometric to the first user biometric;

generating a cryptographic key pair comprising a private key and a public key;
securely saving the private key to the memory;
calculating with the processor, a second cryptographic hash of the second user biometric;
preparing a registration package comprising the public key and the second cryptographic hash of the second user biometric; and
transmitting the registration package via the communication interface to a party server,
wherein, when the first user biometric is securley saved in memory, the user is prevented from altering the first user biometric.

7. The mobile device of claim 6, wherein the memory stores additional instructions for execution by the processor that, when executed, cause the processor to:
receive, via the communication interface, a challenge;
capture a third user biometric with the biometric sensor;
compare, with the processor, the third user biometric with the first user biometric;
prepare, with the processor, a login bundle comprising the challenge and a third cryptographic hash of the third user biometric;
sign the login bundle with the private key; and
transmit the signed login bundle via the communication interface.

8. The mobile device of claim 6, wherein at least one of the first user biometric and the private key is securely saved to the memory using a Trusted Execution Environment.

9. The mobile device of claim 6, wherein the first user biometric comprises a fingerprint, a face, a retinal pattern, an iris pattern, or a voice pattern.

10. The mobile device of claim 6, wherein the enrolling the user biometric further comprises determining that the first factor credentials are valid.

11. A non-transient computer-readable medium containing program instructions for causing a computer to perform a decentralized biometric identity authentication method comprising:
enrolling a user biometric, the enrolling comprising:
receiving first factor credentials via a user interface of a computing device;
capturing a first user biometric with a biometric sensor associated with the computer;
securely saving the first user biometric to a memory of the computing device;
calculating, with a processor of the computing device, a first cryptographic hash of the first user biometric; and
transmitting the first cryptographic hash via a communication interface of the computing device; and
registering the user biometric, the registering comprising:
capturing a second user biometric with the biometric sensor;
comparing, with the processor, the second user biometric to the first user biometric;
generating, with the processor, a cryptographic key pair comprising a private key and a public key;
securely saving the private key to the memory;
calculating, with the processor, a second cryptographic hash of the second user biometric;
preparing, with the processor, a registration package comprising the public key and the second cryptographic hash of the second user biometric; and
transmitting the registration package via the communication interface to s relying party server,
wherein, when the first user biometric is securely saved in memory, the user is prevented from altering the first user biometric.

12. The non-transient computer readable medium of claim 11, wherein the method further comprises:
receiving, via the communication interface, a challenge;
capturing a third user biometric with the biometric sensor;
comparing, with the processor, the third user biometric with the first user biometric;
preparing, with the processor, a login bundle comprising the challenge and a third cryptographic hash of the third user biometric;
signing the login bundle with the private key; and
transmitting the signed login bundle via the communication interface.

13. The non-transient computer readable medium of claim 11, wherein at least one of the first user biometric and the private key is securely saved to the memory using a Trusted Execution Environment.

14. The non-transient computer readable medium of claim 11, wherein the first user biometric comprises a fingerprint, a face, a retinal pattern, an iris pattern, or a voice pattern.

15. The non-transient computer readable medium of claim 11, wherein the enrolling the user biometric further comprises determining that the first factor credentials are valid.

16. Means for decentralized biometric identity authentication, comprising:
means for enrolling a user biometric, the enrolling comprising:
receiving first factor credentials via a user interface of a mobile device;
capturing a first user biometric with a biometric sensor associated with the mobile device;
securely saving the first user biometric to a memory of the mobile device;
calculating, with a processor of the mobile device, a first cryptographic hash of the first user biometric; and
transmitting the first cryptographic hash via a communication interface of the mobile device; and
means for registering the user biometric, the registering comprising:
capturing a second user biometric with the biometric sensor;
comparing, with the processor, the second user biometric to the first user biometric;
generating, with the processor, a cryptographic key pair comprising a private key and a public key;
securely saving the private key to the memory;
calculating, with the processor, a second cryptographic hash of the second user biometric,
preparing, with the processor, a registration package comprising the public key and the second cryptographic hash of the second user biometric; and
transmitting the registration package via the communication interface.

17. The means of claim 16, further comprising:
means for receiving, via the communication interface, a challenge;
means for capturing a third user biometric with the biometric sensor;
means for comparing, with the processor, the third user biometric with the first user biometric;
means for preparing, with the processor, a login bundle comprising the challenge and a third cryptographic hash of the third user biometric;

means for signing the login bundle with the private key; and means for transmitting the signed login bundle via the communication interface.

18. The means of claim 16, wherein at least one of the first user biometric and the private key is securely saved to the memory using a Trusted Execution Environment.

19. The means of claim 16, wherein the first user biometric comprises a fingerprint, a face, a retinal pattern, an iris pattern, or a voice pattern.

20. The means of claim 16, wherein the enrolling the user biometric further comprises receiving the first factor credentials.

\* \* \* \* \*